United States Patent [19]

Bojas et al.

[11] 3,795,109
[45] Mar. 5, 1974

[54] HYDROSTATIC TRANSMISSION DRIVE SYSTEM

[75] Inventors: Edward J. Bojas; Harold R. Ward, both of Marshall, Mich.

[73] Assignee: Eaton Corporation, Cleveland, Ohio

[22] Filed: Apr. 28, 1972

[21] Appl. No.: 248,685

[52] U.S. Cl.................. 60/490, 60/445, 60/468, 60/421, 180/6.48
[51] Int. Cl................................................ F16h 39/46
[58] Field of Search..... 60/325, 435, 445, 460, 466, 60/468, 489, 490

[56] References Cited
UNITED STATES PATENTS

| | | | |
|---|---|---|---|
| 2,232,428 | 2/1941 | Benedek | 60/489 X |
| 2,835,266 | 5/1958 | Morte | 60/468 X |
| 3,393,509 | 7/1968 | Kempson | 60/468 X |
| 3,398,531 | 8/1968 | Swanson et al. | 60/466 |

Primary Examiner—Edgar W. Geoghegan
Attorney, Agent, or Firm—Teagno & Toddy

[57] ABSTRACT

An improved drive system includes a pair of hydrostatic transmissions which are driven by a common engine or prime mover and are drivingly connected with different tracks of a vehicle. The input or output speed ratios of the hydrostatic transmissions are simultaneously varied by operating a single speed control valve to port control fluid pressure to pressure responsive secondary or control motors in pump and motor actuators of the hydrostatic transmissions. A separate steering control valve is associated with each of the hydrostatic transmissions. The pump actuators each include a primary or swashplate motor which is operable to vary the effective displacement of a pump unit of the associated hydrostatic transmission. To effect operation of a swashplate motor, the associated secondary motor is operated to actuate a pilot valve from a null position and port fluid under pressure to the swashplate motor. When the swashplate motor has been operated to an extent corresponding to the extent of operation of the associated secondary motor, a floating link feedback assembly returns the pilot valve to its null position to interrupt operation of the swashplate motor. Shuttle type selector valves port control fluid pressure to the secondary motor actuators. The motor actuators are generally similar in construction to the pump actuators and each includes a secondary motor which operates a pilot valve to port fluid under pressure to a swashplate motor. Pressure regulator assemblies for the hydrostatic loops of the two hydrostatic transmissions contain pressure relief valves. The pressure relief valves have a valve member which is acted upon tending to move it in an opening direction by the fluid pressure in the hydrostatic loop of the associated transmission and is acted upon by a spring and a control pressure tending to urge the valve member in a closing direction. A master relief or pilot valve is opened when the pressure in one of the hydrostatic loops exceeds a predetermined pressure. Opening of the pilot stage relief valve reduces the force urging the relief valve member closed so that it can open and maintain the pressure at a predetermined level in the associated hydrostatic loop. Operation of a parking brake for the vehicle disengages the master relief valve and limits the pressure at which the pilot relief valve opens.

32 Claims, 7 Drawing Figures

HYDROSTATIC TRANSMISSION DRIVE SYSTEM

BACKGROUND OF THE INVENTION

This invention relates generally to a hydrostatic transmission drive system.

Hydrostatic transmissions are commonly used to vary the drive ratio between an engine or other prime mover and the tracks or wheels of a vehicle. These hydrostatic transmissions may include variable displacement pump and motor units with a control system which is actuated by an operator to selectively vary the input to output speed ratio of the hydrostatic transmission. One known control system for varying the input to output speed ratio of a hydrostatic transmission is disclosed in U.S. Pat. No. 3,543,515 and includes a valve assembly which varies the pressure of fluid conducted to control motors to effect a variation in the displacement of pump and motor units of a hydrostatic transmission. Although the drive system disclosed in this patent includes only a single hydrostatic transmission, a pair of hydrostatic transmissions have been utilized in vehicles having two tracks so that one transmission can be associated with each of the tracks. Drive systems including a pair of hydrostatic transmissions are disclosed in U.S. Pat. No. 3,528,243 and in Keith et al. application Ser. No. 158,455, filed June 30, 1971, for Hydrostatic Transmission Speed and Steering Control System now U.S. Pat. No. 3,727,402.

SUMMARY OF THE PRESENT INVENTION

The present invention relates to apparatus for use in connection with a hydrostatic transmission drive system. Although certain features of the invention relate specifically to drive systems which include a pair of hydrostatic transmissions, other features of the invention can be utilized in drive systems which include only a single hydrostatic transmission. More specifically, the present invention includes an improved actuator assembly for varying the displacement of a pump unit of a hydrostatic transmission in response to a variation in control fluid pressure transmitted to the actuator assembly from a pressure regulator type control valve. To enable the input to output speed ratio of the hydrostatic transmission to be varied throughout a relatively large range, a selector valve ports the control fluid to a motor actuator assembly which is operable to effect a variation in the displacement of a motor unit of the hydrostatic transmission.

When the present invention is associated with a pair of hydrostatic transmissions, the operating speed of one of the hydrostatic transmissions can be varied relative to the operating speed of the other hydrostatic transmission by actuating an associated steering valve. The hydrostatic loops of the two transmissions are advantageously provided with high pressure relief valves which limit the fluid pressure in at least one of the hydrostatic loops in response to opening of a common master relief valve.

Accordingly, it is an object of this invention to provide a new and improved apparatus for controlling the operation of a hydrostatic transmission wherein the apparatus includes a pump actuator assembly for changing the displacement of a pump unit of the hydrostatic transmission in response to a variation in the control fluid pressure and a motor actuator assembly for changing the displacement of a motor unit of a hydrostatic transmission in response to a change in control fluid pressure, at least one of the actuator assemblies including a swashplate motor for moving the swashplate of the associated unit of the hydrostatic transmission, a pilot valve for porting fluid to the swashplate motor and a pressure responsive control or secondary motor for operating the pilot valve.

Another object of this invention is to provide a new and improved apparatus for controlling the operation of a plurality of hydrostatic transmissions having variable displacement pump and motor units and wherein the apparatus includes a pair of pump actuator assemblies each of which is associated with a pump unit of one of the hydrostatic transmissions and is operable to vary the displacement of the associated pump unit in response to a change in the control fluid pressure, a pair of motor actuator assemblies each of which is associated with a motor unit of one of the hydrostatic transmissions is operable to vary the displacement of the associated motor unit in response to a change in control fluid pressure, a pressure regulator valve for varying the control fluid pressure, a first steering or secondary valve for varying the control fluid pressure conducted from the pressure regulator valve to the pump and motor actuator assemblies of the first hydrostatic transmission, and a second steering or secondary valve for varying the fluid pressure conducted from the pressure regulator valve to the pump and motor actuator assemblies associated with the second hydrostatic transmission.

Another object of this invention is to provide a new and improved hydrostatic transmission having a relief valve which is operable from a closed condition to an open condition to limit fluid pressure in the hydrostatic loop of the transmission, means for applying a biasing force urging the main relief valve toward the closed condition against a force generated by transmission system pressure, fluid control means normally permitting said biasing means to hold said relief valve in said closed condition, and pilot relief valve means responsive to a predetermined hydrostatic system pressure and operating on said fluid control means at said predetermined system pressure to permit said main relief valve to move to said open condition under the influence of system pressure.

Another object of this invention is to provide a new and improved apparatus for use in association with a pair of hydrostatic transmissions and wherein the apparatus includes a first relief valve operable from a closed condition to an open condition to limit the fluid pressure in the hydrostatic loop of the first hydrostatic transmission, a second relief valve operable from a closed condition to an open condition to limit the fluid pressure in the hydrostatic loop of a second hydrostatic transmission, and a pilot relief valve control means for reducing the closing force applied against at least one of the relief valves in response to the presence of a predetermined opening pressure against one of the relief valves.

Another object of this invention is to provide a new and improved apparatus, in accordance with the next preceding paragraph, and wherein an apparatus is provided for lowering the hydrostatic loop pressure at which the relief valves are operated from the closed condition to the open condition in response to operation of a brake unit to an engaged condition.

DESCRIPTION OF THE DRAWINGS

The foregoing and other objects and features of the invention will become more apparent upon a consideration of the following description taken in connection with the accompanying drawings wherein:

FIG. 5 is a fragmentary sectional view of a selector valve for directing control fluid pressure to the motor actuator assembly, the selector valve being shown in a position corresponding to reverse operation of the associated hydrostatic transmission;

DESCRIPTION OF ONE PREFERRED EMBODIMENT

General Description

Figure 1:
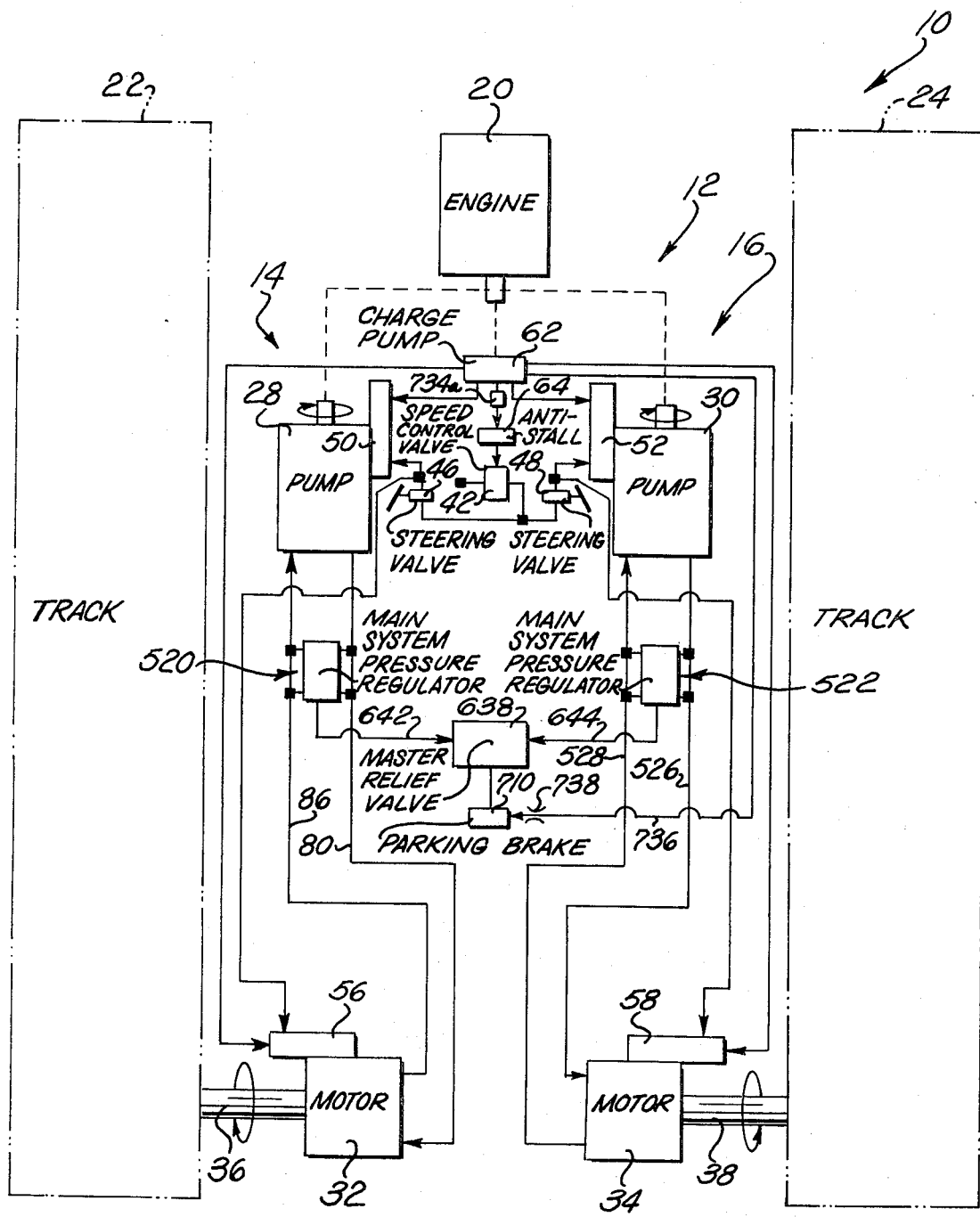
FIG. 1 is a schematic illustration of a tracked vehicle having a hydrostatic transmission drive system constructed in accordance with the present invention.

A vehicle 10 having a hydrostatic transmission drive system 12 constructed in accordance with the present invention is illustrated in FIG. 1. The hydrostatic transmission drive system 12 includes left and right hand hydrostatic transmissions 14 and 16 which transmit drive forces from a common engine or prime mover 20 to left and right tracks 22 and 24 of the vehicle 10. The hydrostatic transmissions 14 and 16 include variable displacement pump units 28 and 30 which are driven by the engine 20 to transmit fluid under pressure to variable displacement motor units 32 and 34 which are drivingly connected with the tracks 22 and 24 by drive shafts 36 and 38.

When the vehicle 10 is being driven along a straight path, the input and output speed ratios of the hydrostatic transmissions 14 and 16 are simultaneously changed by equal amounts upon operation of a speed control or pressure regulator valve 42 which is connected with the hydrostatic transmissions through steering control valves 46 and 48. Assuming that the vehicle 10 is moving forwardly along a straight path at a relatively slow speed, the speed control valve 42 can be operated to increase the control fluid pressure transmitted through the steering valves 46 and 48 to pressure responsive pump actuator assemblies 50 and 52. The increase in control fluid pressure activates the pump actuator assemblies 50 and 52 to increase the effective displacement of the pump units 28 and 30 by equal amounts and thereby increase the forward speed at which the tracks 22 and 24 are driven. If the speed control valve 42 is operated to a sufficient extent, motor actuator assemblies 56 and 58 will decrease the effective displacement of the associated motor units 32 and 34 by equal amounts to further increase the speed at which the tracks 22 and 24 are driven.

If it is desired to turn the vehicle 10 toward either the left or the right, one of the steering control valves 46 or 48 is actuated to reduce the output speed of the hydrostatic transmission 14 or 16 connected with the track 22 or 24 on the side toward which the vehicle is to turn. Thus, if the vehicle is to be turned toward the left, the steering control valve 46 is actuated to reduce the output speed of the hydrostatic transmission 14 and the speed of movement of the track 22 relative to the hydrostatic transmission 16 and track 24. Similarly, if the vehicle is to be turned toward the right, the steering control valve 48 is actuated to reduce the output speed of the hydrostatic transmission 16 and the speed of the track 24.

Control fluid is supplied to the speed control valve 42 from an engine driven charge pump 62 (FIG. 1) through an antistall system 64. In the event of an impending overloading of the engine 20, the anti-stall system 64 effects a reduction in the pressure of the control fluid conducted to the speed control valve 42. This results in a reduction in the pressure of the control fluid ported to the pump and motor actuator assemblies 50, 52, 56 and 58 of the hydrostatic transmissions 14 and 16 to effect a corresponding reduction in the output speeds of the hydrostatic transmissions. Although many different types of anti-stall systems could be utilized, it is preferred to use the anti-stall system disclosed in application Ser. No. 237,086 filed Mar. 22, 1972 and by Edward J. Bojas entitled Hydrostatic Transmission Control System.

The pump unit 28 of the left hand transmission 14 is of the axial piston type (see FIGS. 2 and 3) and has a swashplate 70 which is moved by the actuator assembly 50 to vary the output of the pump unit in a known manner. The pump unit includes a rotary barrel 74 fixedly connected to an engine driven drive shaft 76. When the swashplate 70 is pivoted in a counterclockwise direction from the neutral position illustrated in FIG. 3 to the forward actuated position shown in FIG. 2, high pressure fluid flows through a conduit 80 of the hydrostatic loop 82 (FIG. 2) to the motor unit 32. Low pressure fluid flows from the motor 32 through a condiut 86 of the hydrostatic loop 82 to the pump unit 28. The rate at which fluid flows through the high pressure conduit 80 is increased as the swashplate 70 is moved further from the neutral position of FIG. 3 toward the fully actuated position of FIG. 2.

Figure 2:
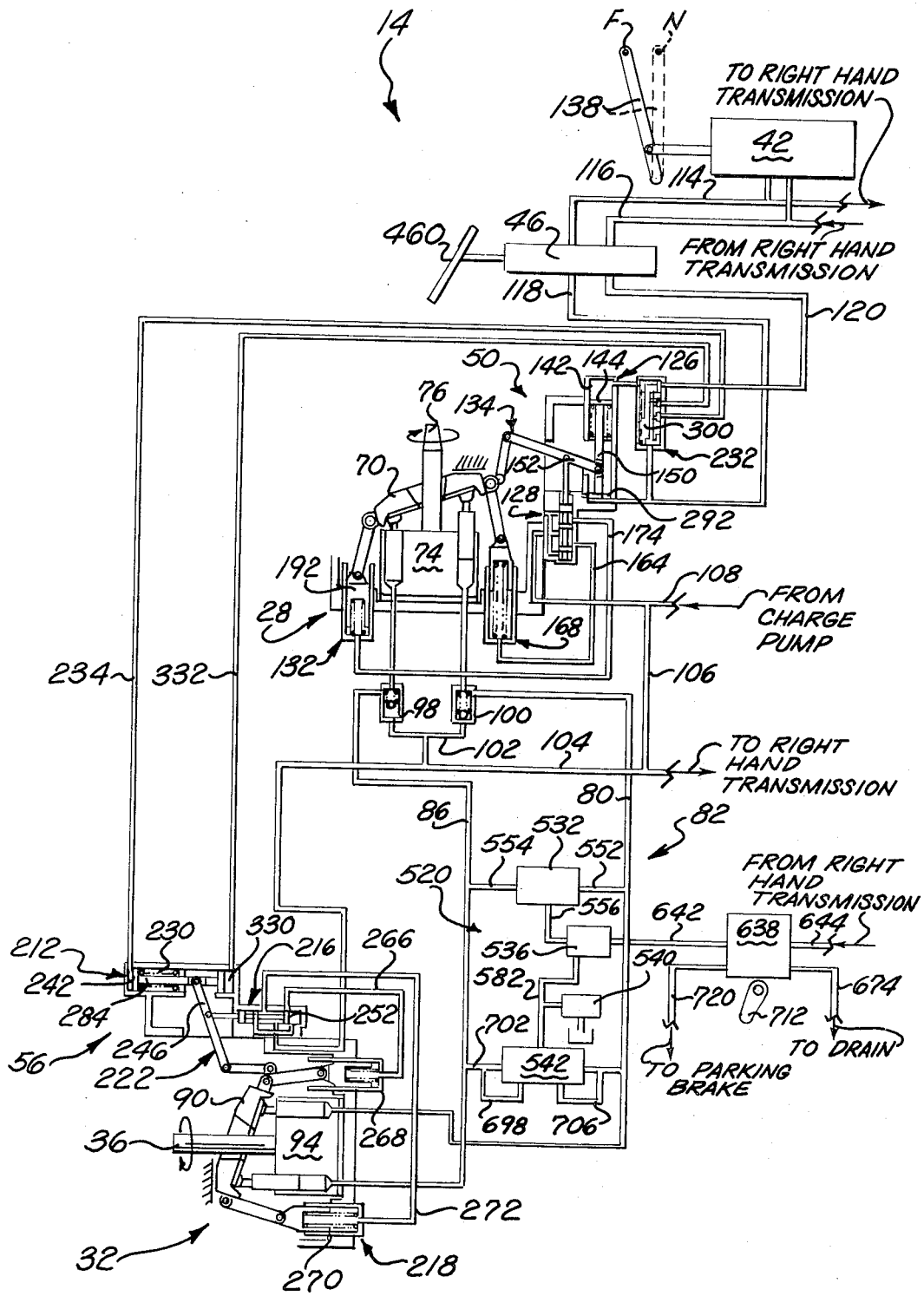
FIG. 2 is a schematic illustration of a hydrostatic transmission utilized to drive one of the tracks of the vehicle of FIG. 1.

When the swashplate 70 of the pump unit 28 reaches the fully actuated position of FIG. 2, the rotational speed of the output shaft 36 is increased, while the engine operating speed remains constant by decreasing the displacement of the motor unit 32. To effect a decrease in the displacement of the motor unit 32, a swashplate 90 of the motor unit 32 is pivoted in a counterclockwise direction (as viewed in FIG. 2) by the motor actuator assembly 56 until the swashplate approaches, but does not reach, a vertical position (as viewed in FIG. 2). This movement of the swashplate 90 decreases the effective displacement of the motor unit 32 so that a barrel or body 94 to which the output shaft 36 is fixedly connected is rotated through a complete revolution under the influence of a relatively small volume of fluid conducted from the pump unit 28 through the conduit 80 to the motor unit 32.

Figure 3:
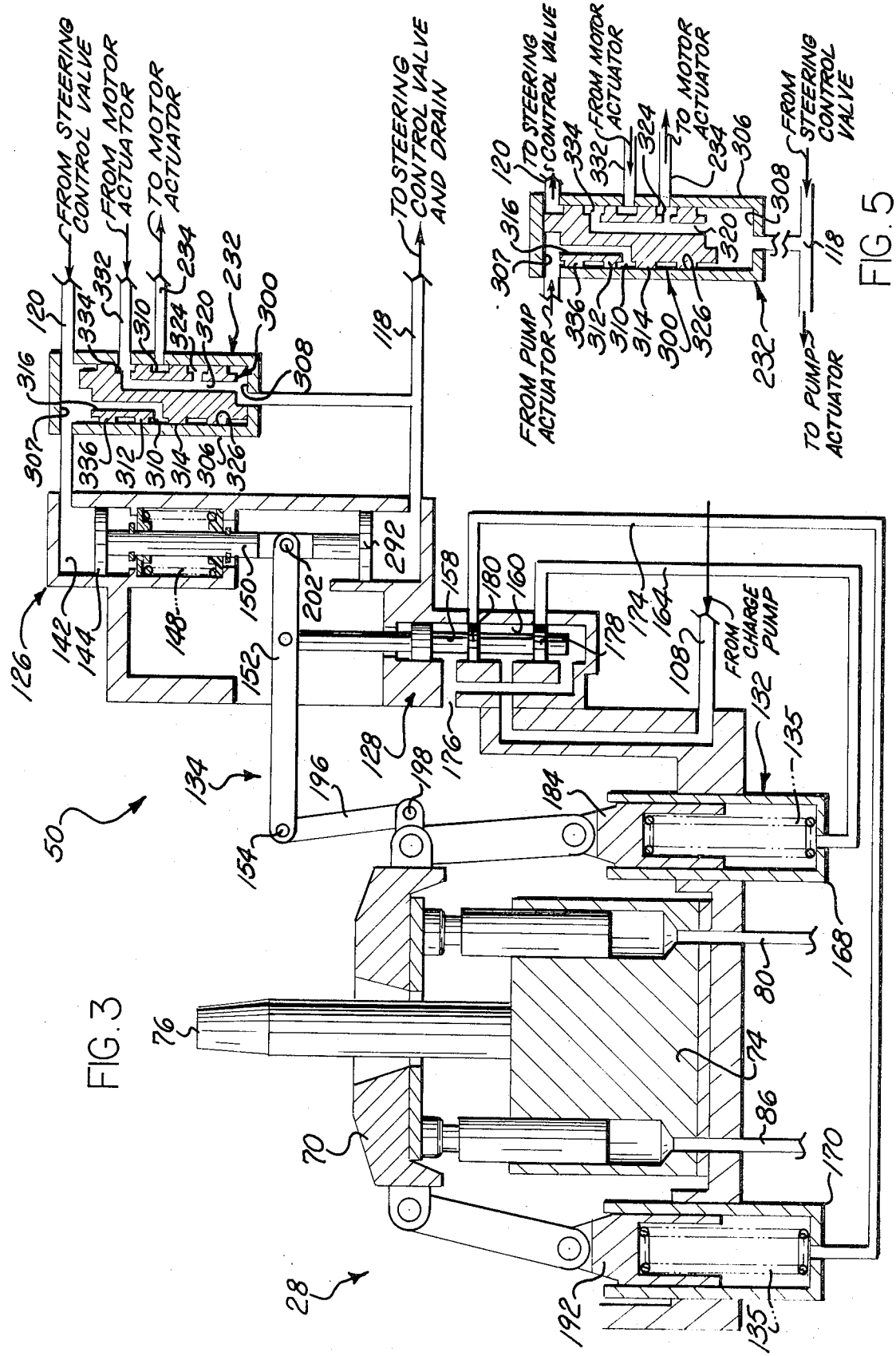
FIG. 3 is an enlarged sectional view of a pump actuator assembly for effecting a change in the displacement of a pump unit of the hydrostatic transmission of FIG. 2, the pump unit being shown in a neutral condition.

The direction of rotation of the output shaft 36 of the motor unit 32 can be reversed, without reversing the direction in which the engine 12 drives the input shaft 76 to the pump unit 28, by pivoting the swashplate 70 of the pump unit 28 in a clockwise direction from the neutral position illustrated in FIG. 3. When the swashplate 70 is pivoted in a clockwise direction from the neutral position of FIG. 3, the pump unit 28 forces fluid under pressure through the conduit 86 to thereby reverse the direction of operation of the motor unit 32. Of course during reverse operation of the pump unit 28, the conduit 80 conducts low pressure fluid from the motor unit 32 back to the pump unit 28. During operation of the pump unit 28 in either the forward or the reverse direction, make up fluid is supplied from the engine driven charge pump 62 to the low pressure conduit 80 or 86 of the hydrostatic loop 82 through check valves 98 and 100 (FIG. 2). The check valves 98 and 100 are connected with the charge pump through conduits 102, 104, 106 and 108.

The right hand hydrostatic transmission 16 (FIG. 1) is of the same construction as the left hand hydrostatic transmission 14 and cooperates with the speed control valve 42 and a steering control valve in the same manner as does the left hand hydrostatic transmission. Thus, the pump and motor actuator assemblies 52 and 58 are activated in response to actuation of the speed control valve 42 to move pump and motor swashplates in the same manner as in which the swashplates 70 and 90 are moved by the pump and motor actuator assemblies 50 and 56.

Pump Actuator Assembly

The pump actuator assembly 50 moves the swashplate 70 of the pump unit 28 in response to changes in control fluid pressure conducted through conduits 114 and 116 (FIG. 2) to the steering control valve 46 and from the steering control valve 46 through conduits 118 and 120 to a pressure responsive control or secondary motor 126 in the pump actuator assembly. Operation of the control motor 126 actuates a pilot valve 128 to port fluid from the charge pump 62 to a swashplate or primary motor 132. A floating link type feedback assembly 134 interconnects the swashplate 70, pilot valve 128, and control motor 126 and closes the pilot valve when the swashplate motor 132 has moved the swashplate through a distance corresponding to the extent of operation of the control motor.

When speed control valve 42 is in its neutral condition, the swashplate 70 of the pump unit 28 is moved to the neutral position of FIG. 3 by biasing springs 135 in the swashplate motor 132. The pump unit 28 will then have zero effective displacement and rotation of the input shaft 76 by the engine or prime mover 20 is ineffective to cause the transmittal of high pressure fluid from the pump unit to the motor unit 32 so that the left-hand track 22 is not driven.

Figure 6:
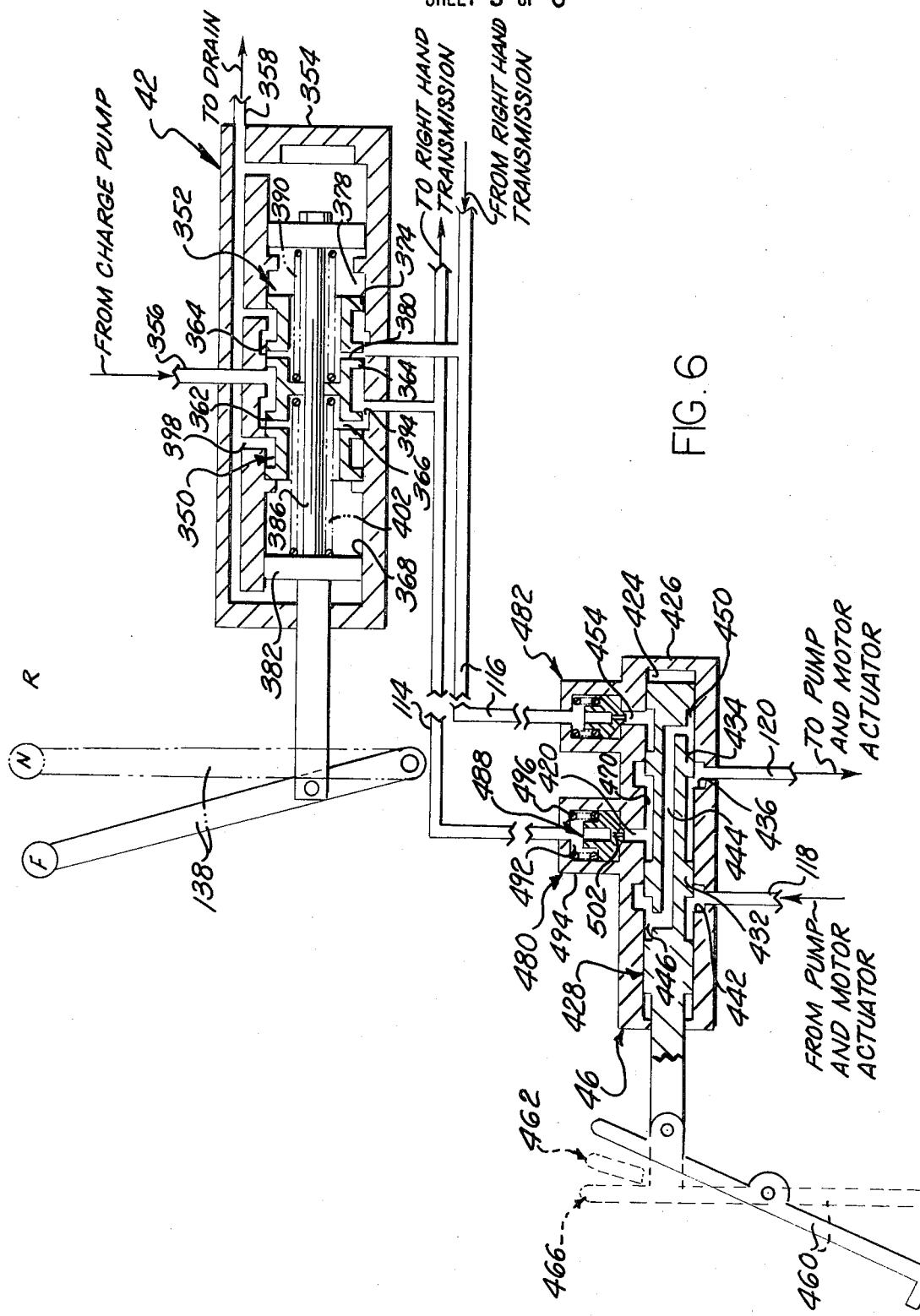
FIG. 6 is an enlarged sectional view depicting the relationship between a pressure or speed control valve and a secondary or steering control valve which are connected in fluid communication with the pump and motor actuator assemblies of FIG. 4.

When it is desired to move the vehicle 10 forwardly, the speed control valve 42 is operated in a forward direction by moving a control handle 138 from the neutral position shown in dashed lines in FIGS. 2 and 6 to a forward actuated position shown in solid lines in FIGS. 2 and 6. This movement of the control handle 138 ports high pressure control fluid through the conduit 114 to the steering valve 46 and from the steering valve 46 through the conduit 120 to a pressure chamber 142 (FIG. 2) of the secondary or control motor 126. The high pressure control fluid causes a piston 144 to move downwardly (as viewed in FIG. 3) against the influence of a spring assembly 148 from the neutral position of FIG. 3 toward the forward actuated position shown in FIG. 4. During this movement of the piston 144, a piston rod 150 pivots a link 152 of the feedback assembly 134 about a connection 154 to move a valve spool 158 from a null position downwardly (as viewed in FIG. 3) in a valve chamber 160. The valve spool 158 is constructed so that when in its null position fluid leakage is directed to the cylinders 168, 170 and corresponding leakage occurs through the cylinders. Movement of the valve spool from the null position ports fluid through a conduit 164 to one cylinder 168 of the swashplate motor 132 and connects another cylinder 170 of the swashplate motor with drain through a conduit 174 (see FIG. 4) and opening 176 leading to a sump connected housing (not shown). Of course, the fluid pressure in the cylinder 168 effects operation of the swashplate motor 132 to pivot the swashplate 70 in a counterclockwise direction to effect operation of the hydrostatic transmission 14 in a forward direction.

Operation of the swashplate motor 132 to pivot the swashplate 70 to a forward actuated position (FIG. 4) corresponding to the extent of operation of the speed control valve 42 and control motor 126 causes the feedback link 152 to return the valve spool 158 to its null position. Thus, when the valve spool 158 is moved downwardly as viewed in FIG. 3 high pressure fluid flows from the charge pump 62 through the conduit 108 to the valve chamber 160 and from the valve chamber through a conduit 164 to the motor cylinder 168. This high pressure fluid forces a piston 184 in the cylinder 168 to move upwardly against the influence of the biasing spring 135 in the opposite motor cylinder 170. Of course, upward movement of the piston 184 results in a counterclockwise pivoting movement of the swashplate 70 (as viewed in FIGS. 3 and 4) and downward movement of the opposite piston 192. As the swashplate 70 is pivoted, a link 196 which is pivotally connected with the swashplate at 198 pivots the link 152 about a connection 202 to the secondary motor piston rod 150 to move the valve spool 158 from the open position of FIG. 4 toward the closed position of FIG. 3. The general mode of interaction between the feedback linkage 134, secondary motor 126, pilot valve 128 and swashplate motor 132 is, in certain respects at least, the same as is disclosed in U.S. Pat. No. 2,396,448.

When the swashplate 70 has been moved by the swashplate motor 132 to an extent corresponding to the extent of operation of the secondary or control motor 126, the feedback linkage 134 operates the pilot valve 128 to its null condition to interrupt further operation of the swashplate motor 132 and movement of the swashplate. When the pilot valve 128 is in its null position, the displacement of the pump unit 28 is maintained constant. In the event that due to some operation the swashplate would have a force applied thereto tending to move it (such as a change in the pressure in the cylinders 168, 170), the link 134 would be operated to move the pilot valve spool 158 and immediately compensate therefor.

Assuming that the operating speed of the engine 20 is not changed, changing the angular position of the swashplate 70 results in a corresponding change in the rate at which fluid is pumped under pressure through the conduit 80 to the motor unit 32 and the speed at which the shaft 36 is rotated in a forward direction. Due to the effect of the feedback linkage 134, the extent to which the swashplate 70 is moved by the swashplate motor 132 is related to the extent to which the secondary or control motor 126 is operated by a change in pressure conducted from the speed control valve 42. However, the change in pressure conducted from the speed control valve 42 to the control motor 126 is related to the distance which the control handle 138 (see FIG. 2) is moved by the operator. Therefore, the operating speed of the output shaft 36 of the motor unit 32 and the speed of the left-hand track 22 is varied to an extent which is a function of the extent of movement of the control handle 138 when the engine 20 is operating at a constant speed.

Motor Actuator Assembly

If the control handle 138 is moved through a relatively large distance in the forward direction from the neutral position, a relatively large change is made in the output speed of the hydrostatic transmission 14. To effect this relatively large change it may be necessary to increase the rotational speed of the output shaft 36 in a forward direction to a greater extent than can be accomplished by moving only the swashplate 70 of the pump unit 28. Therefore, after the swashplate 70 of the motor unit 28 has moved to the fully actuated position of FIG. 2, the swashplate 90 of the motor unit 32 is pivoted in a counterclockwise direction (as viewed in FIG. 4) by the motor actuator assembly 56 to decrease the effective displacement of the motor unit. Decreasing the effective displacement of the motor unit 32 results in a corresponding increase in the output speed of the hydrostatic transmission 14.

The motor actuator assembly 56 includes a single action secondary or control motor 212 which is operated to actuate a pilot valve 216 from its null position (in which it operates as valve 128) to port fluid from the charge pump 62 to a swashplate motor 218. Operation of the swashplate motor 218 pivots the swashplate 90 in a counterclockwise direction from the maximum displacement position of FIG. 4 toward a minimum displacement position. As the swashplate 90 is moved, a feedback linkage 222 operates the pilot valve 216 back toward it null position. When the swashplate motor 218 has been operated to move the swashplate 90 to an extent which is related to the extent of operation of the secondary or control motor 212, the feedback linkage 222 returns the pilot valve 216 to its null position to interrupt movement of the swashplate.

Figure 4:
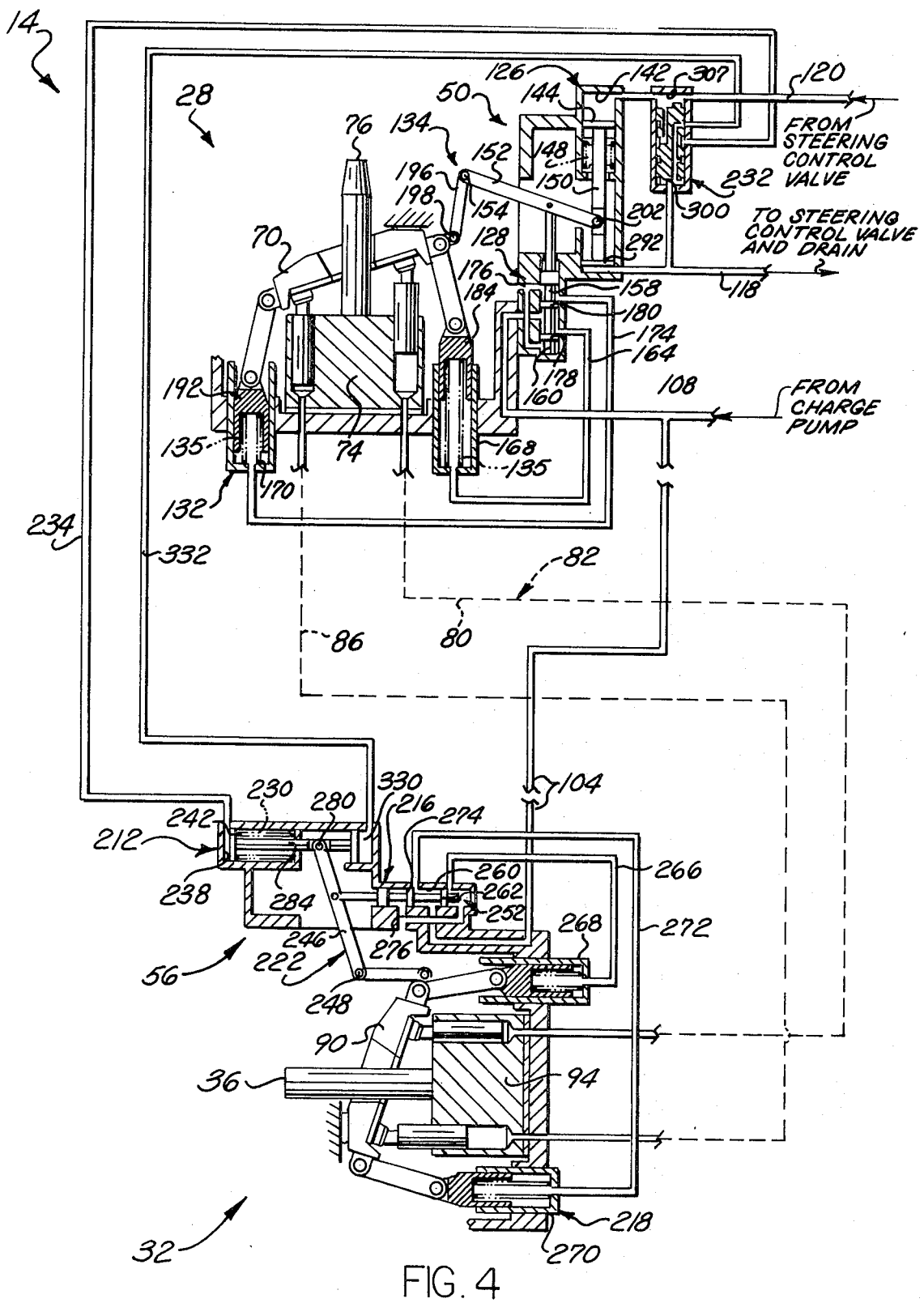
FIG. 4 is a schematic illustration illustrating the relationship between the pump actuator assembly and a motor actuator assembly for changing the displacement of a motor unit of the hydrostatic transmission, the pump unit being shown in a fully actuated or maximum displacement condition corresponding to forward operation of the hydrostatic transmission.

The secondary motor 212 in the motor actuator assembly 56 is biased toward the unactuated position of FIG. 4 by a relatively strong spring assembly 230 so that the motor actuator assembly 56 remains in the unactuated position of FIG. 4 until the pump actuator assembly 50 has been operated to the fully actuated position, also shown in FIG. 4. When the control handle 138 for the speed or pressure controller valve 42 is moved in the forward direction through a relatively large distance from the neutral position, the pressure conducted through the conduit 120 operates the secondary motor 126 in the pump actuator assembly 50 to the fully actuated position of FIG. 4 against the influence of the relatively weak biasing spring 148. The control fluid pressure in the fluid conduit 120 is ported by a selector valve 232 through a conduit 234 leading to a pressure or motor chamber 238 in the control motor 212 of the motor actuator assembly 56. Since the biasing spring 230 is relatively strong, the control motor 212 remains inactive until after the control motor 126 in the pump actuator assembly 50 reaches the fully actuated condition of FIG. 4.

When motor 126 in the pump actuator assembly 28 reaches the fully activated condition, the fluid pressure in chamber 238 of the motor actuator assembly 56 initiates movement of a piston 242 against the influence of the biasing spring assembly 230 to actuate the feedback linkage 222 and operate the pilot valve 216 from its null position (in which it operates as valve 128) to port fluid to the swashplate motor 218. As the piston 242 moves toward the right (as viewed in FIG. 4) a link 246 is pivoted in a clockwise direction about a connection 247 to move a valve spool 252 from its null position to an actuated position. When the valve spool 252 is in the actuated position, fluid supplied from the charge pump 62 through the conduit 104 is ported from a central valve chamber 260 around an annular land 262 to a conduit 266 leading to one power cylinder 268 of the swashplate motor 218. Simultaneously therewith, a second power cylinder 270 of swashplate motor 218 is communicated with drain through a conduit 272, around a land 274 on the valve spool 252 and through a passage 276.

As the swashplate motor 218 is operated, the floating link 246 is pivoted about a connection 280 (FIG. 4) to a piston rod 284 of the secondary motor 212 to move the valve spool 252 toward its null position in which only fluid leakage flows through the conduits 266 and 272 which leaks through the cylinders 268, 270. The feedback linkage 222 moves the valve spool 252 to its closed position when the swashplate motor 218 has been actuated to an extent corresponding to the extent to which the secondary motor 212 is actuated against the influence of the biasing spring 230. Of course, the extent of operation of the secondary motor 212 varies as a direct function of variations in the fluid pressure in the conduit 234.

It should be noted that when the valve spool 252 is in its null position, fluid leaks past the lands thereof to the swashplate cylinders 268, 270 and corresponding leakage occurs through the cylinders 268, 270 so that there is no tendency for a change in the swashplate position. It should be noted that when the secondary motor 212 is in the unactuated or normal position of FIG. 4, the valve spool 252 is in an actuated position connecting the conduit 266 with drain and the conduit 272 with fluid under pressure to thereby maintain the motor unit 32 in its fully operated or maximum displacement position until sufficient fluid pressure is built up in the chamber 238 to actuate the motor 212 against the influence of the biasing spring 230.

When the control handle 138 for the speed control valve 42 (see FIG. 2) is moved back to its initial or neutral position, the motor actuator assembly 56 responds to the resulting decrease in fluid pressure in the conduit 234 to return the motor unit 32 to its full displacement condition shown in FIG. 4. Thereafter, the pump actuator assembly 50 deswashes the pump unit 28 by moving the swashplate 70 back toward the neutral or minimum displacement position shown in FIG. 3. Thus, the effective displacement of the motor unit 32 is increased prior to a decrease in the displacement of the pump unit 28 upon operation of the speed control valve 42 to reduce the control fluid pressure ported to the pump actuator assembly 50 and motor actuator assembly 56.

When the control handle 138 is moved toward the neutral position, the pressure in the conduit 120 is reduced. This reduction in fluid pressure is communicated directly to the secondary motor 126 in the pump actuator assembly 50 and ported by the selector valve 232 to the conduit 234 leading to the secondary motor 212 in the motor actuator assembly 56. The reduction of pressure in the conduit 234 results in a reduction in the pressure in chamber 238. The spring unit 230 can then move the piston 242 toward the left (as viewed in FIG. 4) to thereby swing the feedback link 246 in a counterclockwise direction about the pivot connection 248 and move the pilot valve spool 252 to the open position illustrated in FIG. 4. When the pilot valve 216 is in the position of FIG. 4, it connects the power cylinder 268 with drain and the power cylinder 270 with a source of fluid under pressure to thereby pivot the motor swashplate 90 in a clockwise direction from a relatively low displacement position toward the maximum displacement position shown in FIG. 4. When the swashplate 90 has reached the maximum displacement position of FIG. 4, the pressure in the conduit 120 will have been reduced.

When the fluid pressure in conduit 120 and the chamber 142 of the secondary motor 126 of the pump actuator assembly 50 is sufficiently reduced, the spring unit 148 moves the piston 144 upwardly (as viewed in FIG. 4) to pivot the link 152 of the feedback linage 134 in a counterclockwise direction. This movement of the link 152 moves the spool 158 to connect the conduit 174 in fluid communication with the conduit 108 to port fluid to power cylinder 170 of the swashplate motor 132. The power cylinder 168 of the swashplate motor 132 is connected with drain through the conduit 164 around the annular land 178 of the valve spool 158 (see FIG. 3). This results in the swashplate 70 being pivoted in a clockwise direction from the fully actuated position of FIG. 4 toward the neutral position of FIG. 3. When the swashplate 70 reaches the neutral position of FIG. 3, the valve spool 158 will be in its null position.

When the control lever 138 for the speed control valve 42 is moved in a reverse direction from the neutral position, that is in a clockwise direction from the dashed line position of FIG. 2, the conduit 114 is connected with drain and control fluid pressure is conducted to the pump actuator assembly 50 through the conduits 116 and 118. This results in a piston 292 in the double-acting secondary motor 126 being moved upwardly (as viewed in FIG. 3) to swing the feedback link 152 in a counterclockwise direction about the pivot connection 154. Movement of the feedback line 152 moves the valve spool 158 upwardly (as viewed in FIG. 3) to connect the power cylinder 168 of the swashplate motor 132 with drain through the conduit 164. Simultaneously therewith the power cylinder 170 of the swashplate motor 132 is connected with the conduit 108 from the charge pump 62. This effects operation of the swashplate motor 132 to swing the swashplate 70 in a clockwise direction from the illustrated neutral position. High pressure fluid is then conducted through the conduit 86 to the motor unit 32 to drive the motor 32 in the reverse direction Of course, the farther the swashplate 70 is pivoted in the clockwise direction from the illustrated neutral position of FIG. 3, the faster the motor unit 32 is driven.

When the swashplate 70 reaches its maximum reverse displacement position, the motor actuator assembly 56 is actuated to reduce the effective displacement of the motor unit 32. Since the swashplate 90 of the motor unit 32 is always pivoted in a counterclockwise direction from the fully swashed position illustrated in FIG. 4, the secondary motor 212 in the motor actuator assembly 56 is a single-acting motor which is operated in the same direction whether the output speed of the motor unit 32 is to be increased in the forward or the reverse direction. Thus, the increase in fluid pressure in the conduit 118 is ported by the selector valve 232 to the conduit 234 to activate the motor actuator assembly 56 in the manner previously explained.

Selector Valve

The selector valve 232 ports control fluid pressure from the conduit 120 to the motor actuator assembly 56 during forward operation of the hydrostatic transmission 14. During reverse operation of the hydrostatic transmission 14, the selector valve 232 ports control fluid pressure from the conduit 118 to the motor actuator assembly 56. The selector valve 232 includes a shuttle valve member 300 which is disposed in a housing 306 having an upper end portion 307 (FIGS. 3 and 5) which is connected in fluid communication with the conduit 120 and a lower end portion 308 which is connected in fluid communication with the conduit 118.

The shuttle valve member 300 is moved between the forward and reverse activated positions of FIGS. 3 and 5 in response to operation of the speed control valve 42 between forward and reverse operated conditions. During forward of the hydrostatic transmission 14, control fluid pressure in the conduit 120 is communicated to the upper end portion 307 of the housing 306 and urges the shuttle valve member 300 to the forward actuated position of FIG. 3. Movement of the valve member 300 to this position is facilitated by the fact that the conduit 118 and the lower end portion of the housing 306 are connected with drain through the speed control valve 42. Similarly, when the hydrostatic transmission 14 is operated in the reverse direction, the speed control valve 42 connects the conduit 118 with control fluid pressure and connects the conduit 120 with drain. This results in the shuttle valve 300 being moved to the reverse actuated position of FIG. 5.

The shuttle valve member 300 ports the conduit 234 leading to the pressure chamber 238 in the motor actuator assembly 56 (see FIG. 4) to control fluid pressure upon actuation of the speed control valve 42 to either a forward or a reverse actuated position. Thus, when the speed control valve 42 is operated and the valve spool 300 is moved to the position shown in FIG. 3 under the influence of control fluid pressure in the upper end portion 307 of the housing 306, the conduit 234 is connected with control fluid pressure in the conduit 120 by an annular recess 310 disposed between annular lands 312 and 314 on the valve member 300 and a passage 316 extending in an axial direction through the valve member to the upper end portion 307 of the housing 306. When the valve member 300 is in the reverse actuated position of FIG. 5, control fluid pressure is conducted from the conduit 118 to the conduit 234 through a passage 320 in the valve member and an annular recess 324 formed between lands 314 and 326 on the valve member.

In addition to connecting the pressure chamber 238 with control fluid pressure during either forward or reverse operation of the hydrostatic transmission 14, the selector valve 232 connects a chamber 330 in the secondary motor 212 (see FIG. 4) with drain during either forward or reverse operation of the hydrostatic transmission. Thus when the selector valve 232 is in the forward actuated position of FIG. 3 and the conduit 118 is connected with drain through the speed control valve 42, the conduit 118 is connected by the selector valve 232 with a conduit 332 leading to the chamber 330 in the secondary motor 212 of the motor actuator assembly 56. The conduit 332 is connected with the conduit 118 by the passage 320 in the valve member 300 and an annular recess 334 disposed between lands 312 and 336 on the valve member.

Similarly, when the valve member 300 is in the reverse actuated position of FIG. 5, the low pressure conduit 120 is connected with the conduit 332 leading to the chamber 330 in the secondary motor 212. Thus the conduit 120, which is connected with drain through the speed control valve 42 during reverse operation of the hydrostatic transmission 14, is connected with the conduit 332 through the passage 316 and the annular recess 310. Therefore, the selector valve 232 connects the pressure chamber 238 of the secondary motor 212 in the motor actuator assembly 56 with control fluid pressure and connects the opposite chamber 330 with drain during either forward or reverse operation of the hydrostatic transmission 14.

Although only the pump actuator assembly 50 and motor actuator assembly 56 for the pump unit 28 and motor unit 32 have been shown in FIGS. 2 through 4, it should be understood that the pump actuator assembly 52 for the pump unit 30 and the motor actuator assembly 58 are the same construction. Thus, the motor actuator assembly 52 includes a secondary motor which is connected with the speed control valve 42 through the steering valve 48 in the same manner as in which the secondary motor 126 of the pump actuator assembly 50 is connected with the speed control valve 42 through the steering valve 46. The pump actuator assembly 52, like the pump actuator assembly 50, includes a pilot valve which is operated by an associated secondary or control motor to effect operation of a swashplate motor and therby vary the displacement of the pump unit 30. A feedback linkage, similar to the feedback linkage 134, is provided between the swashplate of the pump unit 30 and the associated pilot valve and secondary motor.

A selector valve, similar to the selector valve 232, directs control fluid pressure to a single action secondary motor in the motor actuator assembly 58 during either forward or reverse operation of the hydrostatic transmission 16 in the same manner as in which the selector valve 232 ports fluid control fluid pressure to the motor actuator assembly 56 of the hydrostatic transmission 14. In addition to a secondary motor, the motor actuator assembly 58 includes a pilot valve which is opearated by the secondary motor to port fluid to a swashplate motor, similar to the swashplate motor 218, to vary the effective displacement of the motor unit 34. In view of their similarity of construction and mode of operation, it is believed that a further description of the pump and motor actuator assemblies for the hydrostatic transmission 16 will not have to be set forth herein in view of the foregoing description of the pump and motor actuator assemblies 50 and 56 for the hydrostatic transmission 14.

Speed Control Valve

The speed control valve 42 is connected in fluid communication, through the steering control valves 46 and 48, with the pump and motor actuator assemblies 50 and 56 for the hydrostatic transmission 14 and with the pump and motor actuator assemblies 52 and 58 for the hydrostatic transmission 16. The conduits 114 and 116 from the speed control valve 42 are connected through the steering control valves 46 and 48 with the pump and motor actuator assemblies for both of the hydrostatic transmissions 14 and 16. Operation of the speed control valve in either a forward or reverse direction from the neutral position (illustrated in dashed lines in FIG. 6) effects operation of the pump and actuator assemblies 50 and 52 for the pump units 28 and 30 to the same extent. If the control handle 138 is moved through a sufficient distance to effect an operation of both pump units 28 and 30 to their fully swashed or maximum displacement conditions, pressure responsive motors in the motor actuator assemblies 56 and 58 simultaneously effect equal decreases in the displacements of the motor units 32 and 34.

The speed control valve 42 is of the pressure regulator type and ports control fluid pressure through the conduit 114 to the steering control valves 46 and 48 upon movement of the control handle 138 in the forward direction from the neutral position. When the fluid pressure in the conduit 114 has been increased to an extent which corresponds to the extent of movement of the control handle 138 from the neutral position, the control valve 42 blocks fluid flow to the conduit 114. Similarly, when control handle 138 is moved in a reverse direction from the neutral position, that is in a clockwise direction from the position illustrated in dashed lines in FIG. 6, control fluid pressure is ported to the conduit 116 which is connected to the steering control valves 46 and 48.

The speed control valve 42 includes a valve spool 350 which is slidably disposed in a generally cylindrical valve chamber 352 in a housing 354. The valve chamber 352 is connected in continuous fluid communication with the charge pump 62 and antistall system 64 by a fluid conduit 356. The valve chamber 352 is also connected with drain by a fluid conduit 358.

Movement of the control handle 138 from the neutral position (illustrated in dashed lines in FIG. 6) to a forward actuated position (illustrated in solid lines in FIG. 6) moves the valve spool 350 from a centered or closed position within the housing 354 toward the left to the actuated or open position illustrated in FIG. 6. This movement of the valve spool 350 ports control fluid pressure from the conduit 356 to the conduit 114 and the steering control valves 46 and 48. In the absence of actuation of one of the steering control valves 46 or 48, the fluid pressure is conducted from the steering control valves to the pump actuator assemblies 50 and 52 and motor actuator assemblies 56 and 58. Thus, high pressure fluid from the charge pump 62 and anti-stall system 64 enters the valve chamber 352 and passes through an annular passage between two circular lands 362 and 364 on the open valve spool 350 to the conduit 114. This high pressure control fluid also flows through a radially extending passage 366 formed at the land 362 to a pressure chamber 368.

While control fluid pressure is being directed from the conduit 114 to pressure chambers of the secondary motors in the pump actuator assemblies 50 and 52 and to pressure chambers of the secondary motors in the motor actuator assemblies 56 and 58, other chambers in the secondary motors are connected with drain through the conduit 116. The conduit 116 is connected with drain through an annular passage between lands 364 and 374 on the valve spool 350 and the drain passage 358. It should be noted that a pressure chamber 378 is also connected with drain by a radially extending passage 380 extending through the circular land 364 (FIG. 6).

As the secondary motors in the pump actuator assemblies 50 and 52 are operated against the influence of their biasing springs, similar to the biasing spring 148, the pressure in the conduit 114 increases. Assuming that the actuator handle 138 was moved in the forward direction through a sufficient distance, the pressure in the conduit 114 continues to increase during actuation of the secondary motors in the motor actuator assemblies 56 and 58 against the influence of spring assemblies similar to the spring assembly 230. The increase in fluid pressure in the conduit 114 is transmitted through the passage 366 in the valve spool 350 to the pressure chamber 368 which is located between a piston element 382 and the valve spool.

As the pressure in the chamber 368 increases, the valve spool 350 slides axially along a support rod 386 from the open position of FIG. 6 toward a closed or centered position against the influence of a biasing spring 390. When the valve spool 350 reaches the closed position, the land 362 is midway of an annular recess 394 in the housing 354. The passage 114 is then connected by the recess 394 with both the control fluid supply conduit 356 and an entrance 398 to the drain conduit 358. The land 362 on the closed or centered valve spool 350 substantially blocks fluid flow to and from the conduit 114 by providing a modulating action between the conduit 114, the control fluid supply conduit 356, and the drain conduit 358. This modulating action maintains the secondary motors in the pump actuator assemblies 50 and 52 and in the motor actuator assemblies 56 and 58 in an operated position which corresponds to the extent to which the control lever 138 is moved from the initial position shown in dashed lines in FIG. 6. However, when the valve spool 350 is in the closed position the conduit 114 and the secondary motors of the pump and motor actuator assemblies 50, 52, 56 and 58 are connected in fluid communication with both the drain conduit 358 and the control fluid supply conduit 356 to facilitate rapid response of the secondary motors to operation of the control valve 42.

Movement of the control handle 138 from the neutral position shown in dashed lines in FIG. 3 results in operation of the secondary motors in the pump actuator assemblies 50 and 52 to an extent which is related to the distance to which the handle 138 is moved. However, if the handle 138 is moved through such a large distance that the pump units 28 and 30 reach the fully swashed position, the secondary motors in the motor actuator assemblies 56 and 58 are actuated to decrease the displacement of the motor units 32 and 34. Thus, when the actuator handle 138 is moved through a relatively large distance, the combined extent to which the secondary motors 126 and 212 in the pump actuator assembly 50 and motor actuator assembly 56 are operated is related to the distance which the handle is moved. Similarly, the combined extent to which the secondary motors in the pump actuator assembly 52 and motor actuator assembly 58 are operated is related to the distance to which the handle 138 is moved. This results from the fact that the pistons in the various secondary motors are moved against the influence of associated biasing springs and that the valve spool 350 is moved against the influence of the biasing spring 390.

The farther the handle 138 is moved in a forward direction from the neutral position, the greater is the extent to which the biasing spring 390 is compressed and the greater is the fluid pressure which must be built up in the pressure chamber 368 to move the valve spool 350 from the open position of FIG. 6 to the closed position in which the valve spool is centered in the valve chamber 352. Of course, the fluid pressure in the chamber 368 is directly proportional to the fluid pressure in the conduit 114. Therefore, the greater the fluid pressure in the chamber 368, the greater the pressure in the motor chambers of the secondary motors for the pump and motor actuator assemblies 50, 52, 56 and 58. The general relationship between the extent to which the handle 138 is moved and the extent to which the control fluid pressure in the conduit 114 is varied is generally similar to that disclosed in U.S. Pat. No. 3,540,220 which is included herein by this reference thereto.

When the valve spool 350 is in the closed or centered position and an impending stall or overloading condition for the engine 20 is encountered, the anti-stall system 64 will decrease the fluid pressure communicated through the conduit 356 to the speed control valve 42. The decrease in fluid pressure is communicated to the conduit 114 and the secondary motors for the pump and motor actuator assemblies 50, 52, 56 and 58. The decrease in fluid pressure also results in a decrease in the fluid pressure in the chamber 368 to enable the spring 390 to move the valve spool 350 to the left from the centered position toward the open position of FIG. 6. This movement of the valve spool 350 increases the communication of the conduit 116 with drain and of the conduit 114 with the fluid pressure supply line 356. Since the fluid pressure in the supply line 356 has been reduced by the anti-stall system 64, the motor actuator assemblies 56 and 58 return the swashplates of the motor units 32 and 34 toward their maximum displacement conditions. Thereafter, the pump actuator assemblies 50 and 52 move the swashplates of the pump units toward their minimum displacement conditions. The valve spool 350 remains in the open position until the fluid pressure in the supply conduit 356 increases sufficiently to again move the valve spool against the influence of the biasing spring 234 to the centered or closed position.

When the control handle is operated in the reverse direction, the valve spool 350 is moved toward the right (as viewed in FIG. 6) to connect the conduit 116 with the fluid supply line 356 and to connect the conduit 114 with drain. As the pressure in the conduit 116 builds up, it is transmitted through the radial passage 380 to the pressure chamber 378 to move the valve spool to the centered modulating position against the influence of the biasing spring 402. Although other known valve constructions could be utilized, the specific speed control valve construction 42 shown in FIG. 6 is preferred due to its cooperation with the anti-stall system 64. The specific construction of the anti-stall system 64 and its interaction with the speed control valve 42 is set forth in the previously mentioned U.S. Pat. application Ser. No. 237,086 filed Mar. 22, 1972 by Edward J. Bojas and entitled Hydrostatic Transmission Control System and is incorporated herein in its entirety by this reference thereto.

Steering Control Valves

The input to output speed ratios of the left and right-hand hydrostatic transmission 14 and 16 can be independently varied by operation of the associated one of the steering valves 46 or 48. Thus, the output speed of the left-hand hydrostatic transmission 14 can be decreased relative to the right-hand hydrostatic transmission 16 by operating the steering valve 46. IF the steering valve 46 is operated sufficiently, the left-hand hydrostatic transmission 14 will stop driving the track 22 (dead track condition) and upon continued operation of the steering valve 46 will reverse the direction of operation of the track 22 to enable the vehicle 10 to turn sharply. Of course, operating the right-hand steering valve 48 results in a corresponding change in the operating speed of the right-hand hydrostatic tranmission 16.

When the left-hand steering control valve 46 is in an initial or unactuated position and the main speed control valve 42 is in the forward operated position (as shown in FIG. 6), the steering control valve ports high pressure fluid from the conduit 114 to the conduit 120 which is connected in fluid communication with the pressure chamber 142 in the secondary motor 126 of the pump actuator assembly 50. Thus, when the steering control valve 46 is in its initial position (shown in solid lines in FIG. 6) high pressure fluid from the conduit 114 is conducted through an inlet 420 to a cylindrical valve chamber 424 formed in a housing 426 and enclosing a slidable valve spool 428. Control fluid from the inlet 420 passes between annular lands 432 and 434 to an annular recess 436 connected with the conduit 120 and the pump actuator assembly 50.

In addition to connecting the secondary motor 126 in the pump actuator assembly 50 with control fluid pressure ported from the speed control valve 42, the steering control valve 46 connects the conduit 118 and the secondary motor 126 (FIG. 3) with the speed control valve 42 which connects them with drain during forward operation of the hydrostatic transmission 14. The conduit 118 is connected in fluid communication with the steering valve chamber 454 through an annular recess 442. When the steering valve 46 is in the unactuated position of FIG. 6, the recess 442 is connected in fluid communication with the conduit 116 by a passage 444 formed in the valve spool 428. The passage 444 has an annular opening 446 which is connected directly with the entrance 442 for the conduit 118 and a second annular opening 450 which is connected directly with an opening 454 in the housing 426 when the valve spool 428 is in the unactuated position illustrated in FIG. 6. The opening 454 is connected in fluid communication with the conduit 116 which is connected with drain through the speed control valve 42 when the speed control valve is in the forward actuated position.

When it is desired to turn the vehicle 10 toward the left (as viewed in FIG. 1) as it is moving forward, the steering valve 46 is actuated to decrease the output speed of the left hand hydrostatic transmission 14 relative to the output speed of the right hand hydrostatic transmission 16 to thereby decrease the speed of the track 22 relative to the track 24. This actuation of the steering valve is effected by pivoting a control member or pedal 460 in a counterclockwise direction from the position shown in solid lines in FIG. 6 toward the position shown in dashed lines at 462 in FIG. 6. As the pedal 460 approaches the dashed line position 462, the lands 432 and 434 on the valve spool 428 are moved into a blocking relationship with the entrances 442 and 436 to the conduits 118 and 120. As the pedal 460 continues to move in a counterclockwise direction from the position illustrated in dashed lines at 462 in FIG. 6 to the position illustrated in dashed lines at 466 in FIG. 6, the entrance 436 to the conduit 120 is connected with the conduit 116 and drain through the speed control valve 42. Similarly, the conduit 118 is connected with the conduit 114 and control fluid pressure by the annular central recess 470 formed between the lands 432 and 434 on the valve spool 428. Thus actuation of the steering control valve 46 during forward operation of the hydrostatic transmission 14 connects the conduit 120, which was initially connected with control fluid pressure, with drain and connects the conduit 118, which was initially connected with drain, with control fluid pressure.

Reversing the drain and control fluid pressure connections for the conduits 118 and 120 results in operation of secondary motor 126 from a forward operating condition toward a reverse operating condition. If the actuator pedal 460 remains in the dashed line position 466 for a sufficient length of time, the control fluid pressure conducted to the secondary motor 126 will reverse the direction of operation of the hydrostatic transmission 14. This is because the piston 144 moves through sufficient distance to activate the swashplate motor 132 to move the swashplate 70 from the forward actuated position of FIG. 4 through the neutral actuated position of FIG. 3 to a reverse actuated position. Of course this effects a reversal in the direction of operation of the motor unit 32 to reverse the direction in which the track 22 is driven by the left hand hydrostatic transmission 14.

If the steering control valve 46 is operated with the motor unit 32 a condition other than the maximum displacement condition of FIG. 4, the control fluid pressure to the secondary motor 212 in the motor actuator assembly 56 is reduced to effect operation of the motor unit 32 to the maximum displacement condition of FIG. 4 prior to operation of the secondary motor 126 in the pump actuator assembly 50. This operation of the secondary motor 212 in the motor actuator assembly 56 results from the fact that the biasing spring assembly 230 in the secondary motor 212 has a higher spring load than the biasing spring 148 in the motor 126 of the pump actuator assembly 50. Of course, a continuing reduction of the control fluid pressure results in subsequent operation of the secondary motor 126 in the pump actuator assembly 50.

If the control pedal 460 for the steering control valve 46 is moved to the fully actuated position with the swashplate 90 (FIG. 4) of the motor unit 32 in a minimum displacement condition, the motor actuator assembly 56 first effects pivotal movement of the motor swashplate 90 back to the maximum displacement condition and then effects pivotal movement of the pump swashplate 70 back to the minimum displacement condition. During the time period in which the swashplate 90 of the motor unit 32 is in its maximum displacement condition, the swashplate 70 in the pump unit 28 is moved from its maximum forward displacement condition (shown in FIG. 4) to a maximum reverse displacement condition. When the swashplate 90 of the motor unit 32 has returned to the minimum displacement position with the swashplate 70 of the pump unit 28 in its maximum reverse displacement condition, the speed and direction at which the drive shaft 36 is driven by the motor unit 32 is reversed to thereby reverse the direction of operation of the track 22 relative to the track 24 and effect a sharp pivoting or rotation of the vehicle 10 about its center.

The steering control valve 48 is of the same construction as the steering control valve 46 and cooperates with the speed control valve 42, pump actuator assembly 52, and motor actuator assembly 58 in the same manner in which the steering valve 46 cooperates with the speed control valve, motor actuator assembly 50, and pump actuator assembly 56. Thus, the steering valve 48 includes a valve chamber which is connected in fluid communication with the conduits 114 and 116 and with the secondary motor for the pump actuator assembly 52. Upon operation of the steering control valve 48, the displacement of the pump unit 30 can be decreased and even reversed to effect a slowing down and reversal of operation of the motor unit 34. However, it should be noted that when the steering valves 46 and 48 are in their unactuated or initial positions the speed control valve 42 controls the speed and direction of operation of the hydrostatic transmissions 14 and 16 to drive the tracks 22 and 24 at the same speed in a forward or reverse direction.

When the steering control valve 46 or 48 associated with one of the hydrostatic transmissions 14 or 16 is actuated, the operation of the other hydrostatic transmission should advantageously be uneffected. However, the steering valves 46 and 48 are connected in fluid communication with each other and the speed control valve 42 by the conduits 114 and 116. Due to this fluid communication, a high rate of flow of control fluid through one of the steering valves 46 or 48 will tend to reduce the control fluid pressure communicated to the other steering valve. Of course, reducing the control fluid pressure communicated to an unactuated steering valve may result in a operation of the associated pump or motor actuator assembly and a reduction in output speed. Therefore, it is necessary to retard the flow of control fluid from the speed control valve 42 through an actuated steering control valve 46 or 48 in order to prevent an undesired reduction in the control fluid pressure conducted to the other steering control valve. It is also desirable to provide for a relatively unrestricted flow of fluid from the secondary motors of the pump and motor actuator assemblies 50, 52, 56 and 58 through the steering valves 46 and 48 to the speed control valve 42 and drain to provide for an accurate response of the secondary control motors to a change in control fluid pressure.

To provide for a restricted flow of control fluid through the steering control valves 46 and 48 to the associated pump and motor actuator assemblies and to enable control fluid to flow freely from the associated pump and motor actuator assemblies through the steering control valves to the speed control valve 42 during operation of the hydrostatic transmissions 14 and 16 at either the forward or reverse direction, a pair of orifice and check valve assemblies 480 and 482 (see FIG. 6) are associated with each of the steering valves 46 and 48. The orifice and check valve assemblies 480 and 482 restrict fluid flow from the speed control valve 42 through the associated steering control valve and enable fluid to flow freely from the associated steering control valve to the speed control valve. Thus during forward operation of the hydrostatic transmission 14, the orifice and check valve assembly 480 restricts fluid flow from the conduit 114 through the steering valve 46 to the conduit 120 which is connected with the pump and motor actuator assemblies 50 and 56. However during forward operation of the hydrostatic transmission 14, fluid can flow freely from the pump and motor actuator assemblies 50 and 56 through the orifice and check valve assembly 482 to drain through the conduit 116. When the hydrostatic transmission 14 is being operated in the reverse direction, the orifice and check valve assembly 482 restricts fluid flow from the conduit 116 to the pump and motor actuator assemblies 50 and 56 while the orifice and check valve assembly 480 enables fluid to flow freely from the pump and motor actuator assemblies 50 and 56 to the speed control valve 42 and drain.

The orifice and check valve assembly 480 includes a valve member 488 which is slidably mounted in a chamber 492 in a housing 494. The valve member 488 is biased to the illustrated closed position under the influence of a spring 496. When the valve member 488 is in the closed position of FIG. 6, fluid under pressure can flow from the conduit 114 to the steering valve chamber 424 through an orifice or restriction 502. The orifice 502 restricts the rate at which fluid can flow from the conduit 114 through the steering valve 46 to the pump and motor actuator assemblies 50 and 56 during operation of the hydrostatic transmission 14 in the forward direction to effectively isolate the pump and motor actuator assemblies 52 and 58 for the right hand transmission 16 from the effects of operation of either the steering valve 46 or the pump and motor actuator assemblies 50 and 56 for the left hand transmission 14 even though the actuator assemblies for the right and left hand transmissions are connected in fluid communication with each other and the speed control valve 42 through the conduit 114. Therefore, the steering valve 46 can be actuated to effect a change in the input to output speed ratio of the hydrostatic transmission 14 without changing the input to output speed ratio of the hydrostatic transmission 16.

When the hydrostatic transmission 14 is to be operated in the reverse direction, fluid is exhausted from the pump and motor actuator assemblies through the conduit 120 to the steering valve 46 and through the conduit 114 to the speed control valve 42 and drain. To enable the pump and motor actuator assemblies 50 and 56 to respond quickly to a change in control fluid pressure, it is necessary to provide for a relatively unrestricted flow of fluid from the pump and motor actuator assemblies 50 and 56 to the speed control valve 42 and drain. To provide for this relatively unrestricted flow, the valve member 488 in the orifice and check valve assembly 480 (FIG. 6) can be opened against the influence of the biasing spring 496 to provide for relatively free communication of fluid from the valve chamber 424 through the inlet 420 around the valve member 488 and to the conduit 114. When the valve member 488 is in the open position, it is spaced from a valve seat and fluid can flow from the inlet 420 through any one of a plurality of longitudinally extending passages formed in the exterior of the valve member 488 to the conduit 114. Thus during reverse operation of the hydrostatic transmission 14, the orifice and check valve assembly 480 enables fluid to flow freely from the steering valve 46 to the speed control valve 42.

During reverse operation of the hydrostatic transmission 14, the orifice and check valve assembly 482 prevents excessive pressure drops from occurring in the conduit 116 during operation of the steering valve 46 to thereby prevent an undesired change in the input to output speed ratio of the hydrostatic transmission 16. Although only the orifice and check valve assemblies 480 and 482 associated with the steering valve 46 have been illustrated in FIG. 6, it should be understood that orifice and check valve assemblies of the same construction cooperate with the steering valve 48 in the same manner. The construction and mode of operation of steering valves, similar to the steering valves 46 and 48, and the manner in which they cooperate with orifice and check valve assemblies, similar to the assemblies 480 and 482, is disclosed and claimed in copending application Ser. No. 248,948, filed Apr. 28, 1972, by Harold R. Ward on Control Valve. The specific construction of the steering control valves 46 and 48 and the specific construction of the associated orifice and check valve assemblies are not per se, part of the present invention. In fact, it is contemplated that the steering control valves 46 and 48 could be constructed as disclosed in the aforementioned Keith et al. application Ser. No. 158,455 filed June 30, 1971.

Main System Pressure Regulation

The hydrostatic transmissions 14 and 16 each include main system pressure regulator assemblies 520 and 522 (see FIG. 1) which relieve excessive fluid pressure in either the high or low pressure conduits of the hydrostatic loop. The main system pressure regulator assembly 520 is connected across the conduits 80 and 86 forming the hydrostatic loop between the pump and motor units 28 and 32 of the left-hand hydrostatic transmission 14. The main system pressure regulator assembly 522 is connected across conduits 526 and 528 of the hydrostatic loop interconnecting the pump and motor units 30 and 34 of the right-hand hydrostatic transmission 16.

During forward operation of the hydrostatic transmissions 14 and 16, high pressure fluid is conducted through the conduits 80 and 526 from the pump units 28, 30 to the motor units 32 and 34. If an excessive load should be applied to either one of the two hydrostatic transmissions, the pressure in the high pressure fluid conduit 80 or 526 will exceed a predetermined maximum operating pressure and the associated pressure regulator assembly 520 or 522 will interconnect the high and low pressure conduits of the hydrostatic loop to by-pass the motor to thereby limit the load on the hydrostatic transmission. During forward operation of the hydrostatic transmissions 14 and 16 the fluid return lines, that is, lines 86 and 528, are connected with drain through low pressure relief valves when a minimum operating pressure is present to enable the two hydrostatic loops to be supplied with makeup fluid conducted from the common charge pump 62 through check valves, similar to the check valves 98 and 100 of FIG. 2.

During reverse operation of the hydrostatic transmissions 14 and 16, the conduits 86 and 528 conduct the high pressure fluid from the pumps 28 and 30 to the motors 32 and 34 while the conduits 80 and 526 return low pressure fluid to the pumps. During reverse operation the pressure regulator assemblies 520 and 522 relieve excessive fluid pressures in these conduits in the same manner as they do during forward operation of the hydrostatic transmissions. In addition, makeup fluid it supplied from the charge pump 62 to the low pressure fluid return lines 80 and 526.

Figure 7:
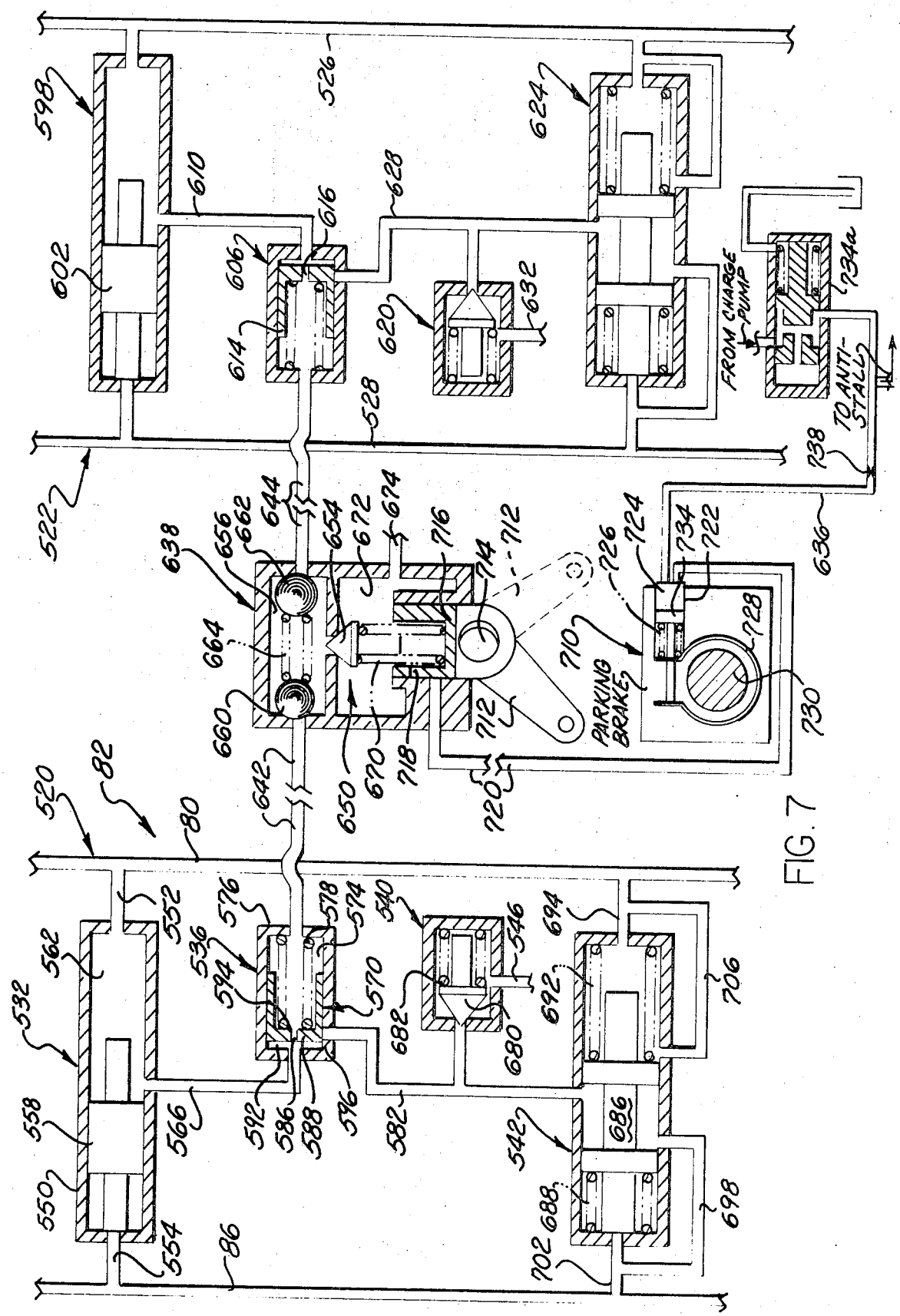
FIG. 7 is an enlarged schematic sectional view illustrating the relationship between main system pressure regulator assemblies for a pair of hydrostatic transmissions and a master relief valve.

The pressure regulator assembly 520 for the left-hand hydrostatic transmission 14 is illustrated in FIG. 7 and includes a high pressure shuttle valve 532 which is connected in fluid communication with the conduits 80 and 86 of the hydrostatic loop 82. The shuttle valve 532 ports fluid pressure in the high pressure conduit, that is, the conduit 80, during forward operation of the left-hand hydrostatic transmission 14 and the conduit 86 during reverse operation of the hydrostatic transmission to a high pressure relief valve 536. The high pressure relief valve 536 opens in response to the presence of excessive fluid pressure in the high pressure in the conduit 80 or 86 and ports the high pressure conduit to low or charge pressure relief valve 540 and a low pressure shuttle valve 542. The charge pressure relief valve 540 is biased closed and opens upon exposure to fluid pressure of a predetermined magnitude to port the fluid to drain through a conduit 546 to relieve the load on the pump and motor units 28 and 32. The low pressure shuttle valve 542 connects the high pressure conduit, that is, the conduit 80, during forward operation of the hydrostatic transmission 14 and the conduit 86 during reverse operation of the hydrostatic transmission, with the low pressure conduit of the hydrostatic loop to thereby short circuit the hydrostatic loop so that the fluid by-passes the motor. This relieves the load on the pump and motor units 28 and 32.

The high pressure shuttle valve 532 includes a housing 550 which is connected to fluid communication with the conduits 80 and 86 of the hydrostatic loop 82 by conduits 552 and 554. A shuttle type valve member 558 is disposed in a valve chamber 562 in the housing 550 and is urged toward the low pressure one of the fluid conduits 80 or 86 under the influence of fluid pressure from the high pressure conduit. Thus, during forward operation of the hydrostatic transmission 14, the shuttle valve member 558 is moved to the position shown in FIG. 7 under the influence of relatively high fluid pressure conducted from the conduit 80 through the conduit 552 to the valve chamber 562 to thereby connect the high pressure conduit 80 in fluid communication with the high pressure relief valve 536 through a conduit 566. During reverse operation of the hydrostatic transmission 14, the shuttle valve member 558 moves to the right-hand end of the valve chamber 562 under the influence of fluid pressure conducted from the relatively high pressure conduit 86 through the conduit 554. The high pressure conduit 86 is then connected in fluid communication with the high pressure relief valve 536 through the conduit 566.

The high pressure relief valve 536 includes a valve member 570 which is disposed in a valve chamber 574 in a housing 576. A weak biasing spring 578 urges the valve member 570 toward a closed position in which it blocks fluid flow from the conduit 566 through a conduit 582 to the shuttle valve 542 and charge pressure relief valve 540. An opening or orifice 586 is provided in a head end 588 of the valve member 570 to enable fluid pressure in the conduit 566 to be communicated from an outer face surface 592 of the valve member 570 to an inner face surface 594 of the valve member 570. Since the conduit 566 is connected in fluid communication with the high pressure conduit of a hydrostatic loop 82, that is, the conduit 80, when the hydrostatic transmission is being operated in a forward direction, the fluid pressure force applied to the inner of back side of the valve member 570 varies as a direct function of variations of the fluid pressure in the high pressure conduit of the hydrostatic loop. It should be noted that the valve during operation is located off its seat 596 and the fluid pressures on the opposite sides of the valve member 570 act on equal areas.

The pressure regulator assembly 522 for the right-hand hydrostatic transmission 16 is of the same construction as is the pressure regulator assembly 520 for the left-hand hydrostatic transmission 14. The pressure regulator assembly 522 includes a high pressure shuttle valve 589 which is connected in fluid communication with the conduits 526 and 528 so that shuttle valve member 602 is moved to the illustrated position under the influence of high pressure fluid in the conduit 526 during forward operation of the hydrostatic transmission 16 and is moved to the right-hand end of its valve chamber under influence of high pressure fluid from the conduit 528 during reverse operation of the hydrostatic transmission 16. A high pressure relief valve 606 is of the same construction as the high pressure relief valve 536 and is connected with the high pressure shuttle valve by a conduit 610. The high pressure relief valve 606 includes a valve member 614 which is biased closed by a spring member and has an opening or orifice 616 from the high pressure conduit of the hydrostatic loop for the right-hand transmission 16 so that pressure is communicated to both sides thereof. Therefore, the fluid pressure acting on the chamber containing the biasing spring varies as a function of variations in the fluid pressure conduit of the hydrostatic loop for the transmission 16. A charge pressure relief valve 620 and a low pressure shuttle valve 624 are connected in fluid communication with the high pressure relief valve 606 by a fluid conduit 628. Upon opening of the charge pressure relief valve 620, fluid pressure in the conduit 628 is ported to drain through a conduit 632.

The two identical high pressure relief valves 536 and 606 for the hydrostatic loops of the transmissions 14 and 16 are connected in fluid communication with a common pilot relief or control valve 638 by fluid conduits 642 and 644. The pilot relief valve 638 includes a control valve 650 which is operable to enable either one or both of the high pressure relief valves 536 and 606 to open when the pressure in the high pressure conduit of the hydrostatic loop exceeds a predetermined maximum pressure.

The control valve 650 has a face surface 654 which is exposed to the fluid pressure in a pressure chamber 656. The pressure chamber 656 is connected in fluid communication with the high pressure relief valves 536 and 606 through check valves 660 and 662 and the conduits 642 and 644, respectively. When the pressure in the valve chamber for one of the high pressure relief valves 536 or 606 exceeds a predetermined minimum pressure to open the associated check valve against the influence of a biasing spring 664, the fluid pressure in the chamber 656 is equal to the fluid pressure in the high pressure relief valve. For example, the fluid pressure in the valve chamber 574 of the high pressure relief valve 536 is communicated through the conduit 642 and check valve 660 to the pressure chamber 656.

When the pressure against one of the high pressure relief valves 536 or 606 and the fluid pressure in the high pressure conduit of the associated hydrostatic loop exceeds a predetermined operating pressure, the control valve 650 is opened against the influence of a biasing spring 670 to enable fluid to be conducted from the pressure chamber 656 to a relief chamber 672 and a conduit 674 leading to drain. Thus, when the fluid pressure in the chamber 656 exceeds a predetermined pressure determined by the biasing force applied against the control valve 650 by the relatively stiff spring 670, the control valve 650 is opened to connect the pressure chamber 656 in communication with the relief chamber 672. Of course, this results in a reduction in the pressure in the chamber 656 to thereby relieve the pressure applied against at least one of the high pressure relief valves 536 and 606.

When the pressure against the relief valve 536 is reduced due to operation of the control valve 650 to its open position, the fluid pressure in the hydrostatic loop 82 is relieved by the low pressure shuttle valve 542 which by-passes fluid so that it does not flow through the motor. Upon opening of the high pressure relief valve 536, fluid under pressure flows from the conduit 566 through the high pressure relief valve to the conduit 582 and the charge pressure relief valve 540. The charge pressure relief valve 540 includes a valve member 680 which is urged to a closed position under the influence of a biasing spring 682. The fluid pressure in the conduit 582 if sufficient operates the valve member 680 to its open position to connect the conduit 582 with drain through the conduit 546 to thereby relieve the pressure in the high pressure conduit of the hydrostatic loop 82. In addition, the low pressure shuttle valve 542 connects the high pressure conduit of the hydrostatic loop 82 in fluid communication with the low pressure conduit of the hydrostatic loop to thereby short-circuit the hydrostatic loop and further relieve the load applied to the hydrostatic transmission 14.

During forward operation of the hydrostatic transmission 14, a shuttle valve member 686 in the low pressure shuttle valve 542 is biased to the position shown in FIG. 7 against the influence of a biasing spring 688 by fluid pressure conducted from the high pressure conduit 80 to a valve chamber 692 by a conduit 694. Fluid pressure against the right-hand end (as viewed in FIG. 7) of the shuttle valve member 686 moves the valve member to connect the conduit 582 in fluid communication with a conduit 698 which is connected in fluid communication with the low pressure conduit 86 of the hydrostatic loop 82 by a conduit 702. Thus, when the fluid pressure in the high pressure conduit of the hydrostatic loop 82 exceeds a predetermined maximum operating pressure, the master relief valve 638 relieves the pressure applied against the high pressure relief valve member 570 and the high pressure relief valve 536 opens to connect the high pressure conduit 80 with the low pressure conduit 86 of the hydrostatic loop through the low pressure shuttle valve 542.

During operation of the hydrostatic transmission 14 in the reverse direction, the pressure regulator assembly 520 operates in a similar manner to relieve excessive pressures in the high pressure conduit 86 of the hydrostatic loop 82. During reverse operation, the valve member 558 of the high pressure shuttle valve 532 is moved toward the right from the position shown in FIG. 7 to connect the conduit 86 in fluid communication with the relief valve 536. If the pressure in the conduit 86 should exceed a predetermined maximum operating pressure, the master relief valve 650 is operated to relieve the pressure applied against the valve member 570 so that it moves to the open position to connect the conduit 86 in communication with the charge pressure relief valve 540 and the low pressure shuttle valve 542 through the conduit 582. The high pressure conduit 86 is connected in fluid communication with the low pressure conduit 80 through the low pressure shuttle valve 542, since the valve member 686 will have moved to the right of the position shown in FIG. 7 to connect the conduit 582 with the conduit 80 through a conduit 706.

If one of the tracks 22 or 24 of the vehicle 10 encounters a relatively large load during operation of the vehicle in a forward direction while the other track 24 is subjected to a relatively small load, only the high pressure relief valve for the hydrostatic transmission subjected to the large load will be opened. Thus, if the track 22 (FIG. 1) should be subjected to one excessive operating load while the track 24 is subjected to normal loading, only the high pressure relief valve 536 is opened to relieve the load on the transmission 14. The hydrostatic transmission 16 will continue to operate in the forward direction at the same speed and will be unaffected by the relieving by the excessive pressure in the hydrostatic loop 82 for the hydrostatic transmission 14. This is because the check valve member 662 is held closed under the influence of the fluid pressure in the chamber 656 and prevents fluid pressure applied against the valve member 614 of the high pressure relief valve 606 from being relieved even though the control valve 650 opens under the influence of the biasing pressure applied against the valve member 570 of the high pressure relief valve 536. The control valve 650 closes under the influence of the spring 670. This will result in a build up in the fluid pressure in the chamber 656 and a restoration of the pressures on the opposite order of the valve member 570 so that the high pressure relief valve 536 closes. It should be noted that during this time the relief valve 606 remains closed if the fluid pressure in the high pressure conduit of the hydrostatic loop for the transmission 16 does not exceed normal operating pressures.

During normal operation of the hydrostatic transmissions 14 and 16 it is necessary to cool the fluid being conducted through the hydrostatic loops. This is accomplished by draining fluid from the hydrostatic loops and replacing it with fluid which is pumped from a reservoir or cooling tank by the charge pump 62 to the low pressure conduits of the hydrostatic loops for the two transmissions 14 and 16. Thus, during forward operation of the hydrostatic transmission 14, fluid under pressure from the charge pump 62 is conducted from the conduits 108 (see FIG. 2), 106, 104 to the check valve 98 which is connected with the low pressure conduit 86 of the hydrostatic loop 82. As relatively cool fluid from the charge pump enters the hydrostatic loop through the check valve 98, relatively hot fluid is conducted from the low pressure conduit of the hydrostatic loop 82 through the low pressure shuttle valve 542 and the charge pressure relief valve 540. The biasing force applied against the charge pressure relief valve member 680 by the spring 682 is relatively low so that the fluid pressure in the low pressure conduit of the hydrostatic loop 82 opens the charge pressure relief valve 540 to enable fluid to flow through the conduit 546 to drain. The conduit 104 is connected with the hydrostatic loop for transmission 16 through suitable check valves, similar to the check valves 98 and 100. The low pressure relief valve 620 enables hot fluid to flow from the transmission 16 to drain.

Although the pressure regulator assembly 522 for the hydrostatic transmission 16 has not been described in detail, it should be understood that the pressure regulator assembly 522 is of the same construction as the pressure regulator assembly 520 and operates in the same manner. Thus, the pressure regulator assembly 522 cooperates with the master relief valve assembly 638 to relieve excessive pressures in the hydrostatic loop of the transmission 16 in response to the application of excessive biasing pressures against the valve member 614 of the high pressure relief valve 606. In addition, the low pressure shuttle valve 624 and charge pump pressure relief valve 620 cooperate with the low pressure conduit of the hydrostatic loop the transmission 16 to enable relatively hot fluid to be conducted from the low pressure conduit to drain and a relatively cool make up fluid to be supplied to the hydrostatic loop.

Brake Assembly

Upon operation of a parking brake 710 (FIG. 7) to an engaged condition, the fluid pressure required to open the control valve 650 in the master relief valve 638 is reduced to prevent loading of the hydrostatic transmissions 14 and 16 against the influence of the brake. The parking brake 710 is operated from a disengaged condition to an engaged condition by moving a control handle 712 is a counterclockwise direction from the position shown in solid lines to the position shown in dashed lines in FIG. 7. This movement of the control handle 712 pivots an eccentric 714 to lower a valve cylinder 716 so that an opening 718 in the side wall of the valve cylinder 716 is in alignment with an opening to a conduit 720 leading to an operating cylinder 722 for the parking brake 710. When the opening 718 in the valve cylinder 716 is in alignment with the opening to the conduit 720, the conduit 720 is connected with drain through the conduit 674 to reduce the fluid pressure in a pressure chamber 724 in the operating cylinder 722. This enables a biasing spring 726 to move a brake band 728 into secure frictional engagement with a brake shaft 730.

When the valve cylinder 716 is lowered by rotational movement of the eccentric 714 and actuator handle 712, the force applied by the biasing spring 670 against the valve 650 is reduced. This reduction in the biasing pressure against the control valve 650 enables the valve to open under the influence of a relatively low fluid pressure in the chamber 656. Therefore, the master relief valve 638 and high pressure relief valves 536 and 606 operate to their open conditions whenever the fluid pressure in one of the hydrostatic loops exceeds a predetermined relatively low fluid pressure. Of course, this prevents the hydrostatic transmissions 14 and 16 from being subjected to their normal operating loads when the brake 710 is engaged.

During operation of the vehicle 10, a piston 734 in the operating cylinder 722 is exposed to fluid pressure conducted from the charge pump 62 through a monitor valve 734a, a conduit 736 and an orifice 738. The orifice 738 prevents an excessive drain on the charge pump 62 when the control handle 712 is operated to connect the conduit 720 with drain. The monitor valve 734a operates to assure that a sufficient pressure is provided to the system and to the brakes so that the brakes are released when the valve is opened directing pressure to the system. Since the fluid pressure from the charge pump 62 presses against the spring 726 to maintain the parking brake 710 in a disengaged condition, if the engine 20 should be loaded to such an extent that an impending stall is present, the fluid pressure in the conduit 736 is substantially reduced so that the spring 726 can move the piston 734 against the pressure in the chamber 724 to engage the parking brake 710.

Summary

The hydrostatic transmission drive system 12 includes a pair of variable displacement hydrostatic transmissions 14 and 16 which are driven from a common engine 20 to drive tracks 22 and 24 of the vehicle. During relatively low speed operation of the vehicle, the input to output speed ratios of the hydrostatic transmissions 14 and 16 are simultaneously varied by operating a speed control valve 42 to activate pump actuator assemblies 50 and 52 to change the displacement of pump units 28 and 30. During high speed operation of the vehicle 10, operation of the speed control valve 42 activates motor actuator assemblies 56 and 58 to vary the displacements of the motors 32 and 34. When it is desired to turn the vehicle 10, one of the steering control valves 46 or 48 is actuated to decrease the output speed of the associated hydrostatic transmission and the speed at which the associated vehicle track is driven.

When the speed control valve 42 is operated to effect a relatively large increase the speed at which the vehicle 10 moves forwwardly in a straight line, high pressure control fluid is conducted through the steering control valves 46 and 48 to the pump actuator assemblies 50 and 52. The control fluid activates the pump actuator assemblies 50 and 52 to increase the displacement of the pump units 28 and 30 to their maximum displacements to provide part of the desired increase in vehicle speed. Once this has occurred, relatively high pressure fluid conducted through selector valves, similar to the selector valve 232, activates the motor actuator assemblies 56 and 58 to decrease the effective displacement of the motor vehicle units 32 and 34 to provide the remainder of the desired increase in vehicle speed.

If the steering control valve associated with one of the hydrostatic transmissions 14 or 16 is operated while the vehicle 10 is moving straight foward, the motor actuator assembly associated with one of the motor units 32 or 34 is activated to initially increase the effective displacement of the motor unit and thereby decrease the speed at which a track of the vehicle is driven. The pump actuator assembly for the associated pump unit 28 and 30 is then activated to decrease the effective displacement of the associated pump unit 28 or 30 and effect a further decrease in the speed of one of the vehicle tracks. Continued actuation of the steering control valve causes the pump actuator assembly to reverse the displacement of the associated pump unit to thereby reverse the direction of operation of the associated hydrostatic transmission. Once the pump unit has reached its maximum effective reverse displacement, the motor actuator assembly is activated to again decrease the displacement of the associated motor unit.

The pump actuator assemblies 50 and 52 are of the same construction and each include a primary or swashplate motor, similar to the motor 132, which is operable to vary the effective displacement of the associated pump unit. To effect operation of a swashplate motor, an associated secondary motor, similar to the motor 126, is operated to activate a pilot valve from a null position, similar to the pilot valve 128, to port fluid under pressure to the swashplate motor. When the swashplate motor has been operated to an extent corresponding to the extent of operation of the associated secondary motor, a floating link feedback assembly moves the pilot valve back to its null position to stop the swashplate motor. Shuttle type selector valves, similar to the selector valve 232, port control fluid pressure to the motor actuator assemblies 56 and 58. The motor actuator assemblies 56 and 58 are generally similar in construction to the pump actuator assemblies and each includes a secondary motor which operates a pilot valve to port fluid under pressure to a swashplate motor.

Pressure regulator assemblies 520 and 522 for the hydrostatic loops of each of the transmission 14 and 16 are connected with a common master relief valve 638. Each of the pressure regulator assemblies 520 and 522 includes a high pressure relief valve, similar to the valve 536, which is operable from a closed condition to a bypass condition to limit the fluid pressure in the hydrostatic loop of the associated transmission. The high pressure relief valve is maintained in a closed condition until the master relief valve 638 is opened to reduce the pressure applied across the high pressure relief valve spool. The high pressure relief valve then opens to connect the high pressure conduit of the hydrostatic loop in the associated hydrostatic transmission with the low pressure conduit of the hydrostatic loop.

It should be understood that although the construction of the pump and motor actuator assemblies 50 and 52 for the hydrostatic transmission 14 has been more fully described than the construction of the pump and motor actuator assemblies 52 and 58 for the hydrostatic transmission 16, the pump actuator assembly 52 has the same construction and mode of operation as the pump actuator assembly 50 and the motor actuator assembly 58 has the same construction and mode of operation as the motor actuator assembly 56. It should also be understood that although the steering control valve 46 has been more fully illustrated than the steering control valve 48, the steering control valve 48 is of the same construction as the steering control valve 46. While the pump and motor actuator assemblies 50, 52, 56 and 58, speed control valve 42 and steering control valves 46 and 48 have been disclosed in association with the hydrostatic transmission drive system 12 which includes a pair of hydrostatic transmissions 14 and 16, it is contemplated that many of the features will be utilized in the hydrostatic transmission drive systems which include only a single hydrostatic transmission.

Having described a specific preferred embodiment of the invention, the following is claimed:

1. A hydrostatic transmission comprising a pump unit, a motor unit, first conduit means for conducting fluid under pressure from said pump unit to said motor unit, second conduit means for conducting fluid from said motor unit to said pump unit, said pump unit including a swashplate which is movable in one direction from a neutral position to vary the rate at which fluid flows through said first conduit means to said motor unit to effect operation of said motor unit in a forward direction and is movable in an opposite direction from the neutral position to cause fluid to flow through said second conduit means to said motor unit to effect operation of said motor unit in the reverse direction, high pressure relief valve means operable between a closed condition blocking fluid flow and an open condition enabling fluid to flow from said first conduit means to reduce the fluid pressure in said first conduit means, means for applying to said high pressure relief valve means a force which urges said high pressure relief valve means toward the closed condition and which force varies as a function of variations in the fluid pressure in said first conduit means, first by-pass valve means for directing fluid from said first conduit means to said high pressure relief valve means during operation of said motor means in the forward direction and for directing fluid from said second conduit means to said high pressure relief valve means during operation of said motor means in the reverse direction and second by-pass valve means for directing fluid from said high pressure relief valve means to said second conduit means during operation of said motor means in the forward direction and for directing fluid from said high pressure relief valve means to said first conduit means during operation of said motor means in the reverse direction, charge pressure relief valve means for enabling fluid to flow from said second by-pass valve means to drain during operation of said motor unit in either the forward or reverse direction, and control means for limiting said force applied to said high pressure relief valve means so that it does not exceed a predetermined force.

2. A hydrostatic transmission comprising a variable displacement pump unit having a movable swashplate, pump actuator means for varying the displacement of the pump unit during both forward and reverse operation of the hydrostatic transmission, said pump actuator means including primary motor means for moving the swashplate of the pump unit in either one of two directions from an initial position, a pilot valve operable between a null position and any one of a plurality of actuated positions enabling fluid to flow from a source of fluid to said primary motor means to effect operation of said primary motor means and movement of the swashplate of the pump unit in either one of the two directions, secondary motor means for operating said pilot valve between the null and actuated positions, said secondary motor means being operable to varying extents in either one of two directions from an initial position in response to variations in control fluid pressure conducted to said secondary motor means, and feedback means for operating said pilot valve from any one of the plurality of actuated positions to the null position in response to movement of the swashplate of the pump unit by said primary motor means to an extent which is a function of the extent of operation of said secondary motor means, a motor unit, first conduit means for conducting fluid under pressure from said pump unit to said motor unit, second conduit means for conducting fluid from said motor to said pump unit, high pressure relief valve means operable between a closed condition blocking fluid flow and an open condition enabling fluid to flow from said first conduit means to reduce the fluid pressure in said first conduit means, means for applying to said high pressure relief valve means a force which urges said high pressure relief valve means toward the closed condition and which force varies as a function of variations in the fluid pressure in said first conduit means, and control means for limiting said force applied to said high pressure relief valve means so that it does not exceed a predetermined force.

3. A hydrostatic transmission comprising a variable displacement pump unit having a movable swashplate, a variable displacement motor unit having a movable swashplate, first conduit means for conducting fluid under pressure from said pump unit to said motor unit, second conduit means for conducting fluid from said motor unit to said pump unit, high pressure relief valve means operable between a closed condition blocking fluid flow and an open condition enabling fluid to flow from said first conduit means to reduce the fluid pressure in said first conduit means, means for applying to said high pressure relief valve means a force which urges said high pressure relief valve means toward the closed condition and which force varies as a function of variations in the fluid pressure in said first conduit means, control means for limiting said force applied to said high pressure relief valve means so that it does not exceed a predetermined force, pump actuator means for varying the displacement of the pump unit during both forward and reverse operation of the hydrostatic transmission, said pump actuator means including reversible primary motor means for moving the swashplate of the pump unit in either one of two directions from an initial position, a pilot valve operable between a null position and any one of a plurality of actuated positions enabling fluid to flow from a source of fluid to said primary motor means to effect operation of said primary motor means and movement of the swashplate of the pump unit in either one of the two directions, reversible secondary motor means for operating said pilot valve between the null and actuated positions, said secondary motor means being operable to varying extents in either one of two directions from an initial position in response to variations in control fluid pressure conducted to said secondary motor means, and floating link feedback means for operating said pilot valve from any one of the plurality of actuated positions to the null position in response to movement of the swashplate of the pump unit by said primary motor means to an extent which is a function of the extent of operation of said secondary motor means, third conduit means for conducting control fluid pressure to said secondary motor means to effect operation of said secondary motor means in a first direction and operation of the pilot valve to one actuated position porting fluid to said primary motor means to move the swashplate of the pump unit in a first direction from the initial position to thereby effect operation of the hydrostatic transmission in the forward direction, fourth conduit means for conducting control fluid pressure to said secondary motor means to effect operation of said secondary motor means in a second direction and operation of the pilot valve to another actuated position porting fluid to said primary motor means to move the swashplate of the pump unit in a second direction from the initial position to thereby effect operation of the hydrostatic transmission in the reverse direction, motor actuator means for moving the swashplate of the motor unit through a distance which varies as a function of variations in control fluid pressure conducted to said motor actuator means during both forward and reverse operation of the hydrostatic transmission, fifth fluid conduit means for conducting control fluid pressure to said motor actuator means, selector valve means for porting control fluid pressure from said third fluid conduit means to said fifth fluid conduit means during operation of the hydrostatic transmission in the forward direction and for porting control fluid pressure from said fourth fluid conduit means to said fifth fluid conduit means during operation of the hydrostatic transmission in the reverse direction, and pressure controller means varying the control fluid pressure conducted to said third fluid conduit means during forward operation of the hydrostatic transmission and to said fourth fluid conduit means during reverse operation of the hydrostatic transmission to control the extent to which the swashplates of the pump and motor units are moved by said pump and motor actuator means.

4. An apparatus comprising a reversible hydrostatic transmission having a variable displacement pump unit with a movable swashplate, said apparatus comprising pump actuator means for varying the displacement of the pump unit during both forward and reverse operation of the hydrostatic transmission by moving the swashplate, said pump actuator means including reversible primary motor means for moving the swashplate of the pump unit in either one of two directions from an initial position, a pilot valve operable between a null position and any one of a plurality of actuated positions enabling fluid to flow from a source of fluid to said primary motor means to effect operation of said primary motor means and movement of the swashplate of the pump unit in either one of the two directions, reversible secondary motor means for operating said pilot valve between the null and actuated positions, said secondary motor means being operable to varying extents in either one of two directions from an initial position in response to variations in control fluid pressure conducted to said secondary motor means, floating link feedback means interconnected between said pilot valve, said swashplate and said secondary motor means for operating said pilot valve from any one of the plurality of actuated positions to the null position in response to movement of the swashplate of the pump unit by said primary motor means to an extent which is a function of the extent of operation of said secondary motor means, pressure controller means for varying the control fluid pressure conducted to said secondary motor means as a function of the extent of operation of said pressure controller means from an initial condition to control the extent to which the swashplate of the pump unit is moved, a variable displacement motor unit having a movable swashplate, first conduit means for conducting control fluid pressure to said secondary motor means to effect operation of said secondary motor means in a first direction and operation of the pilot valve to one actuated position porting fluid to said primary motor means to move the swashplate of the pump unit in a first direction from the initial position to thereby effect operation of the hydrostatic transmission in the forward direction, second conduit means for conducting control fluid pressure to said secondary motor means to effect operation of said secondary motor means in a second direction and operation of the pilot valve to another actuated position porting fluid to said primary motor means to move the swashplate of the pump unit in a second direction from the initial position to thereby effect operation of the hydrostatic transmission in the reverse direction, motor actuator means for moving the swashplate of the motor unit through a distance which varies as a function of variations in control fluid pressure conducted to said motor actuator means during both forward and reverse operation of the hydrostatic transmission, third fluid conduit means for conducting control fluid pressure to said motor actuator means, and selector valve means for porting control fluid pressure from said first fluid conduit means to said third fluid conduit means during operation of the hydrostatic transmission in the forward direction and for porting control fluid pressure from said second fluid conduit means to said third fluid conduit means during operation of the hydrostatic transmission in the reverse direction.

5. An apparatus as defined in claim 4 wherein said pilot valve in said pump actuator means is effective in its null position to direct fluid leakage flow to said reversible primary motor means which is constructed to enable leakage to flow therethrough without actuation thereof.

6. An apparatus as defined in claim 4 wherein said pilot valve in said pump actuator means comprises a valve spool movable in opposite directions from its null position, said apparatus further comprising a charge pump for directing control fluid to said pressure controller means and to said pilot valve in said pump actuator means.

7. An apparatus as set forth in claim 4 further including fourth fluid conduit means for conducting control fluid from said motor actuator means, said selector valve means being operable to port control fluid from said fourth fluid conduit means to said second fluid conduit means during operation of the hydrostatic transmission in the forward direction and to port control fluid from said fourth fluid conduit means to said first fluid conduit means during operation of the hydrostatic transmission in the reverse direction.

8. An apparatus as set forth in claim 4 further including steering valve means connected with said first and second fluid conduit means intermediate said selector valve means and said pressure controller means for varying the control fluid pressure conducted to said pump actuator means and to said motor actuator means while maintaining the setting of said pressure controller means constant.

9. An apparatus as set forth in claim 4 wherein said selector valve means includes a valve member movable between a first position connecting said first fluid conduit means in fluid communication with said third fluid conduit means and a second position connecting said second fluid conduit means with said third fluid conduit means, means for exposing said valve member to the control fluid pressure in said first fluid conduit means to urge said valve member to the first position during operation of the hydrostatic transmission in the forward direction, and means for exposing said valve member to the control fluid pressure in said second fluid conduit means to urge said valve member to the second position during operation of the hydrostatic transmission in the reverse direction.

10. An apparatus as set forth in claim 4 wherein said motor actuator means includes primary motor means for moving the swashplate of the motor unit from an initial position to an actuated position to reduce the displacement of the motor unit, a motor pilot valve operable between a null position and an actuated position enabling fluid to flow to said primary motor means in said motor actuator means, secondary motor means for operating said pilot valve in said motor actuator means between the open and closed position, said secondary motor means in said motor actuator means being connected in fluid communication with said third fluid conduit means and being operable to varying extents from an initial position in response to variations in control fluid pressure conducted through said third fluid conduit means to said motor actuator means, and floating link feedback means interconnected between said hydrostatic motor swashplate, motor pilot valve, and said secondary motor means for said hydrostatic motor for operating said motor pilot valve to the null position in response to movement of the swashplate of the motor unit to an extent which is a function of the extent of operation of said secondary motor means in said motor actuator means.

11. An apparatus as set forth in claim 4 wherein the hydrostatic transmission includes a hydrostatic loop for conducting fluid between the pump and motor units, said apparatus further including brake means operable from a released condition to an activated condition to retard movement of a vehicle with which the hydrostatic transmission is associated, relief valve means operable from a closed position to an open position in response to the presence of excessive fluid pressure in the hydrostatic loop, means for urging said relief valve means to the closed position with a predetermined force, and means for varying the predetermined force from a relatively large force to a relatively small force upon operation of said brake means from the activated condition to the released condition.

12. An apparatus as set forth in claim 4 further including relief valve means operable between a closed condition and an open condition enabling fluid to flow from a hydrostatic loop in the hydrostatic transmission to thereby limit the fluid pressure in the hydrostatic loop, means for applying to said relief valve means a force which urges said relief valve means toward the closed condition and which varies as a function of variations in the fluid pressure in a high pressure portion of the hydrostatic loop, and control means for limiting the force applied to said relief valve means, said relief valve means including a valve member movable between a closed position blocking fluid flow from the hydrostatic loop to an open position enabling fluid to flow from the hydrostatic loop, said means for applying a force to said relief valve means including means for exposing a surface of said valve member to the fluid pressure in the high pressure portion of the hydrostatic loop, and said control means including means for exposing said surface of said valve member to a source of reduced pressure.

13. A hydrostatic transmission comprising a pump unit, a motor unit, first conduit means for conducting fluid under pressure from said pump unit to said motor unit, second conduit means for conducting fluid from said motor unit to said pump unit, high pressure relief valve means operable between a closed condition blocking fluid flow and an open condition enabling fluid to flow from said first conduit means to reduce the fluid pressure in said first conduit means, means for applying to said high pressure relief valve means a force which urges said high pressure relief valve means toward the closed condition and which force varies as a function of variations in the fluid pressure in said first conduit means, brake means operable between a release condition and an activated condition in which said brake means retards movement of a vehicle associated with said hydrostatic transmission, said brake means including a brake unit which is separate from said pump and motor units of said hydrostatic transmission, and control means for limiting said force applied to said high pressure relief valve means so that it does not exceed a predetermined force, said control means including means for varying the predetermined force from a relatively large predetermined force to a relatively small predetermined force in response to operation of said brake means from the release condition to the activated condition.

14. A hydrostatic transmission as set forth in claim 13 further including third conduit means for conducting fluid from said first conduit means to said second conduit means, said relief valve means includes a valve member movable between a closed position blocking fluid flow through said third conduit means and an open position enabling fluid to flow through said third conduit means, said means for applying said force to said relief valve means including means for exposing a surface of said valve member to the fluid pressure in said first conduit means, and said control means including means for exposing said surface of said valve member to a source of reduced pressure when said force exceeds the predetermined force.

15. A hydrostatic transmission as set forth in claim 13 wherein said pump unit includes a swashplate which is movable in one direction from a neutral position to vary the rate at which fluid flows through said first conduit means to said motor unit to effect operation of said motor unit in a forward direction and is movable in an opposite direction from the neutral position to cause fluid to flow through said second conduit means to said motor unit to effect operation of said motor unit in the reverse direction, said hydrostatic transmission including by-pass valve means for directing fluid from said first conduit means to said relief valve means during operation of said motor means in the forward direction and for directing fluid from said second conduit means to said relief valve means during operation of said motor means in the reverse direction.

16. A hydrostatic transmission as set forth in claim 13 wherein said pump unit includes a swashplate which is movable in one direction from a neutral position to vary the rate at which fluid flows through said first conduit means to said motor unit to effect operation of said motor unit in a forward direction and is movable in an opposite direction from the neutral position to cause fluid to flow through said second conduit means to said motor unit to effect operation of said motor unit in the reverse direction, said hydrostatic transmission further including first by-pass valve means for directing fluid from said first conduit means to said high pressure relief valve means during operation of said motor means in the forward direction and for directing fluid from said second conduit means to said high pesssure relief valve means during operation of said motor means in the reverse direction and second by-pass valve means for directing fluid from said high pressure relief valve means to said second conduit means during operation of said motor means in the forward direction and for directing fluid from said high pressure relief valve means to said first conduit means during operation of said motor means in the reverse direction.

17. An apparatus comprising a reversible hydrostatic transmission having a variable displacement pump unit with a movable swashplate, fluid pressure responsive pump actuator means for varying the displacement of the pump unit during both forward and reverse operation of the hydrostatic transmission by moving the pump swashplate, said pump actuator means including primary motor means for moving the pump swashplate in either one of two directions from an initial position, a pump pilot valve operable between a null position and any one of a plurality of actuated positions enabling fluid to flow from a source of fluid to said primary motor means to effect operation of said primary motor means and movement of the pump swashplate of the pump unit in either one of the two directions, secondary motor means for operating said pump pilot valve between the null and actuated positions, said secondary motor means being operable from an initial position to an extent which varies as a function of variations in control fluid pressure conducted to said secondary motor means, and feedback means connected with said pump pilot valve, pump swashplate and secondary motor means for operating said pump pilot valve from one of the plurality of actuated positions to the null position in response to movement of the pump swashplate by said primary motor means to an extent which is a function of the extent of operation of said secondary motor means, pressure controller means for varying the control fluid pressure conducted to said secondary motor means during both forward and reverse operation of the hydrostatic transmission and as a function of the extent of operation of said pressure controller means in one direction from an initial condition during forward operation of the hydrostatic transmission and as a function of the extent of operation of said pressure controller means from the initial condition in another direction opposite from said one direction during reverse operation of the hydrostatic transmission to control the extent to which the pump swashplate is moved, first fluid conduit means for conducting fluid pressure from said pressure controller means to said secondary motor means, a variable displacement motor unit connected in fluid communication with said pump unit and having a movable swashplate, fluid pressure responsive motor actuator means for moving the swashplate of the motor unit through a distance which varies as a function of variations in control fluid pressure conducted to said motor actuator means from said pressure controller means, said motor actuator means including primary motor means for moving the motor swashplate from an initial position to an actuated position to reduce the displacement of the motor unit, a motor pilot valve operable between a null position and an actuated position enabling fluid to flow to said primary motor means in said motor actuator means, secondary motor means for operating said motor pilot valve between the actuated and null positions, and feedback means connected with said motor swashplate, motor pilot valve, and said secondary motor means in said motor actuator means for operating said motor pilot valve to the null position in response to movement of the motor swashplate to an extent which is a function of the extent of operation of said secondary motor means in said motor actuator means, and second fluid conduit means for conducting fluid pressure from said pressure controller means to said secondary motor means in said motor actuator means during both forward and reverse operation of the hydrostatic transmission.

18. An apparatus as set forth in claim 17 wherein said secondary motor means in said pump actuator means includes means defining a first operating chamber for receiving fluid pressure from said pressure controller means during operation of said hydrostatic transmission in a forward direction and means defining a second operating chamber for receiving fluid pressure from said pressure controller means during operation of said hydrostatic transmission in a reverse direction, said apparatus further including selector valve means for porting fluid pressure from said pressure controller means to said first operating chamber during forward operation of said hydrostatic transmission and for porting fluid pressure from said pressure controller means to said second operating chamber during reverse operation of said hydrostatic transmission, said selector valve means including a valve member movable between a first position porting fluid under pressure to said first operating chamber and a second position porting fluid under pressure to said second operating chamber, means for receiving fluid pressure from said pressure controller means to effect movement of said valve member to the first position upon operation of said pressure controller means in the one direction from the initial condition, and means for receiving fluid pressure from said pressure controller means to effect movement of said valve member to the second position upon operation of said pressure controller means in the other direction from said initial condition.

19. An apparatus as set forth in claim 18 further including steering control valve means connected in series with said selector valve means and said pressure controller means for varying the fluid pressure ported to said first operating chamber by said selector valve means during forward operation of said hydrostatic transmission and for varying the fluid pressure ported to said second operating chamber during reverse operation of said hydrostatic transmission.

20. An apparatus as set forth in claim 17 wherein said secondary motor means in said pump actuator means includes means defining a first operating chamber for receiving fluid under pressure from said pressure controller means during operation of said hydrostatic transmission in a forward direction and means defining a second operating chamber for receiving fluid under pressure from said pressure controller means during operation of said hydrostatic transmission in a reverse direction, said apparatus further including selector valve means for porting fluid pressure from said pressure controller means to said first operating chamber during forward operation of said hydrostatic transmission, for porting fluid pressure from said pressure controller means to said second operating chamber during reverse operation of said hydrostatic transmission, and for porting fluid pressure from said pressure controller means to said second conduit means during either forward or reverse operation of said hydrostatic transmission.

21. An apparatus as set forth in claim 20 further including steering control valve means connected in series with said selector valve means and said pressure controller means for varying the fluid pressure ported to said first operating chamber by said selector valve means during forward operation of said hydrostatic transmission, for varying the fluid pressure ported to said second operating chamber during reverse operation of said hydrostatic transmission, and for varying the fluid pressure ported to said second conduit means during either forward or reverse operation of said hydrostatic transmission.

22. An apparatus as set forth in claim 17 wherein said feedback means in said pump actuator means includes a movable link pivotally connected with said pump pilot valve, pump swashplate and secondary motor means in said pump actuator means, said link being movable in a first direction under the influence of the pump swashplate to move said pump pilot valve to the null position upon movement of the pump swashplate in one of the two directions to an extent which corresponds to the extent of operation of said secondary motor means in said pump actuator means under the influence of fluid pressure conducted thereto from said pressure controller means, said link being movable in a second direction under the influence of said pump swashplate to move said pump pilot valve to the null position upon movement of the pump swashplate in the other of the two directions to an extent which corresponds to the extent of operation of said secondary motor means in said pump actuator means under the influence of fluid pressure conducted thereto from said pressure controller means.

23. An apparatus as set forth in claim 22 wherein said feedback means in said motor actuator means includes a second movable link connected with said motor pilot valve, motor swashplate, and said secondary motor means in said motor actuator means, said second link being movable under the influence of the motor swashplate to move said motor pilot valve to the null position upon movement of the motor swashplate to an extent which corresponds to the extent of operation of said secondary motor in said motor actuator means under the influence of fluid pressure conducted thereto from said pressure controller means.

24. An apparatus as set forth in claim 17 wherein the hydrostatic transmission includes a hydrostatic loop for conducting fluid between said pump and motor units, said apparatus further including brake means operable from a released condition to an activated condition to retard movement of a vehicle with which the hydrostatic transmission is associated independently of the hydrostatic transmission, relief valve means operable from a closed position to an open position to reduce the fluid pressure in at least a portion of the hydrostatic loop, means for urging said relief valve means to the closed position under the influence of a fluid pressure force, and means for reducing the fluid pressure force upon operation of said brake means from the activated condition to the released condition.

25. An apparatus as set forth in claim 17 further including relief valve means operable between a closed condition and an open condition enabling fluid to flow from a hydrostatic loop in the hydrostatic transmission to thereby limit the fluid pressure in the hydrostatic loop, means for applying to said relief valve means a force which urges said relief valve means toward the closed condition and which varies as a function of variations in the fluid pressure in a high pressure portion of the hydrostatic loop, and control means for limiting the force applied to said relief valve means, said relief valve means including a valve member movable between a closed position blocking fluid flow from the hydrostatic loop to an open position enabling fluid to flow from the hydrostatic loop, said means for applying a force to said relief valve means including means for exposing a surface of said valve member to the fluid pressure in the high pressure portion of the hydrostatic loop, and said control means including means for exposing said surface of said valve member to a source of reduced pressure.

26. An apparatus as defined in claim 17 wherein said pump pilot valve is effective in its null position to direct fluid leakage flow to said reversible primary motor means which is constructed to enable leakage to flow therethrough without actuation thereof.

27. An apparatus comprising a pump unit, a motor unit, first conduit means for conducting fluid under pressure from said pump unit to said motor unit during operation of said pump unit, second conduit means for conducting fluid from said motor unit to said pump unit during operation of said pump and motor units, relief valve means operable between a closed condition blocking fluid flow and an open condition enabling fluid to flow from said first conduit means to reduce the fluid pressure in said first conduit means, means for applying to said relief valve means a fluid pressure force which urges said relief valve means toward the closed condition during operation of said pump and motor units, brake means operable from a released condition to an activated condition to retard movement of a vehicle with which said pump and motor units are associated, said brake means including a brake unit which is separate from said pump and motor units, and control means for reducing the fluid pressure force applied to said relief valve means upon operation of said brake means from said released condition to said activated condition.

28. An apparatus as set forth in claim 27 further including third conduit means for conducting fluid from said first conduit means to said conduit means, said relief valve means includes a valve member movable between a closed position blocking fluid flow through said third conduit means and an open position enabling fluid to flow through said third conduit means, said means for applying a fluid pressure force to said relief valve means including means for exposing a surface of said valve member to a first fluid pressure, and said control means including means for exposing said surface of said valve member to a source of a second fluid pressure which is less than said first fluid pressure.

29. An apparatus comprising a pump unit, a motor unit, first conduit means for conducting fluid under pressure from said pump unit to said motor unit, second conduit means for conducting fluid from said motor unit to said pump unit, first valve means operable between a closed condition blocking fluid flow and an open condition enabling fluid to flow from said first conduit means to reduce the fluid pressure in said first conduit means, means for exposing at least a portion of said first valve means to a fluid pressure force urging said first valve means toward the closed condition, brake means operable from a released condition to an activated condition to retard movement of a vehicle with which said pump and motor units are associated, said brake means including biasing means for effecting operation of said brake means from the released condition to the engaged condition and pressure chamber means for receiving fluid under pressure to hold said brake means in the released condition against the influence of said biasing means, second valve means operable from a first condition to a second condition to effect a reduction in the fluid pressure in said pressure chamber means and operation of said brake means from said released condition to said activated condition under the influence of said biasing means and to simultaneously therewith effect operation of said first valve means from said closed condition to said open condition by effecting a reduction in the fluid pressure force to which said portion of said first valve means is exposed, and selectively actuatable control means for effecting operation of said second valve means from said first condition to said second condition to effect operation of said brake means and a reduction in the fluid pressure in said first conduit means.

30. An apparatus as set forth in claim 29 wherein said first valve means includes means for connecting said first conduit means in fluid communication with said second fluid conduit means upon operation of said first valve means to the open condition.

31. An apparatus comprising a reversible hydrostatic transmission having a variable displacement pump unit with a movable swashplate, said apparatus comprising fluid pressure responsive pump actuator means for varying the displacement of the pump unit during both forward and reverse operation of the hydrostatic transmission by moving the pump swashplate, said pump actuator means including means defining a first operating chamber for receiving fluid under pressure during operation of said hydrostatic transmission in a forward direction and means defining a second operating chamber for receiving fluid under pressure during reverse operation of said hydrostatic transmission, pressure controller means for varying the control fluid pressure conducted to said first and second operating chambers as a function of the extent of operation of said pressure controller means from an initial condition to control the extent to which the pump swashplate is moved, first fluid conduit means for conducting fluid pressure from said pressure controller means to said first operating chamber during forward operation of said hydrostatic transmission, second fluid conduit means for conducting fluid pressure from said pressure controller means to said second operating chamber during reverse operation of said hydrostatic transmission, a variable displacement motor unit connected in fluid communication with said pump unit and having a movable swashplate, fluid pressure responsive motor actuator means for moving the swashplate of the motor unit through a distance which varies as a function of variations in control fluid pressure conducted to said motor actuator means from said pressure controller means, said motor actuator means including means defining a third operating chamber for receiving fluid pressure from said pressure controller means during operation of said hydrostatic transmission in the forward and reverse directions, third fluid conduit means for conducting fluid pressure from said pressure controller means to said third operating chamber in said motor actuator means during forward and reverse operation of said hydrostatic transmission, and selector valve means connected with said first, second, and third conduit means for porting fluid pressure from said pressure controller means to said first operating chamber during forward operation of said hydrostatic transmission, for porting fluid pressure from said pressure controller means to said second operating chamber during reverse operation of said hydrostatic transmission, and for porting fluid pressure from said pressure controller means to said third operating chamber during either forward or reverse operation of said hydrostatic transmission, said selector valve means including a valve member movable between a first position porting fluid pressure to said first and third operating chambers and a second position porting fluid pressure to said second and third operating chambers.

32. An apparatus comprising a reversible hydrostatic transmission having a variable displacement pump unit with a movable swashplate, said apparatus comprising fluid pressure responsive pump actuator means for varying the displacement of the pump unit during both forward and reverse operation of the hydrostatic transmission by moving the pump swashplate, said pump actuator means including primary motor means for moving the pump swashplate in either one of two directions from an initial position, a pump pilot valve operable between a null position and any one of a plurality of actuated positions enabling fluid to flow from a source of fluid to said primary motor means to effect operation of said primary motor means and movement of the pump swashplate of the pump unit in either one of the two directions, secondary motor means for operating said pump pilot valve between the null and actuated positions, said secondary motor means being operable from an initial position to an extent which varies as a function of variations in control fluid pressure conducted to said secondary motor means, and feedback means connected with said pump pilot valve, pump swashplate and secondary motor means for operating said pump pilot valve from one of the plurality of actuated positions to the null position in response to movement of the pump swashplate by said primary motor means to an extent which is a function of the extent of operation of said secondary motor means, said pump pilot valve being effective in its null position to direct fluid leakage flow to said reversible primary motor means which is constructed to enable leakage to flow therethrough without actuation thereof, pressure controller means for varying the control fluid pressure conducted to said secondary motor means to control the extent to which the pump swashplate is moved, first fluid conduit means for conducting fluid pressure from said pressure controller means to said secondary motor means, a variable displacement motor unit connected in fluid communication with said pump unit and having a movable swashplate, pressure responsive motor actuator means for moving the swashplate of the motor unit through a distance which varies as a function of variations in control fluid pressure conducted to said motor actuator means from said pressure controller means, and second fluid conduit means for conducting fluid pressure from said pressure controller means to said motor actuator means.

* * * * *

UNITED STATES PATENT OFFICE
CERTIFICATE OF CORRECTION

Patent No. 3,795,109  Dated March 5, 1974

Inventor(s) Edward J. Bojas et al.

It is certified that error appears in the above-identified patent and that said Letters Patent are hereby corrected as shown below:

Column 9, line 62, "linc" should read -- link --.

Column 36, line 60, after "said", second occurrence, insert -- second --.

Signed and sealed this 1st day of October 1974.

(SEAL)
Attest:

McCOY M. GIBSON JR.
Attesting Officer

C. MARSHALL DANN
Commissioner of Patents